(12) United States Patent  
Morgenstern

(10) Patent No.: US 7,682,724 B2  
(45) Date of Patent: Mar. 23, 2010

(54) USE OF METAL SUPPORTED COPPER CATALYSTS FOR REFORMING ALCOHOLS

(75) Inventor: David A. Morgenstern, Creve Coeur, MO (US)

(73) Assignee: Monsanto Technology LLC, St. Louis, MO (US)

( * ) Notice: Subject to any disclaimer, the term of this patent is extended or adjusted under 35 U.S.C. 154(b) by 1112 days.

(21) Appl. No.: 10/687,541

(22) Filed: Oct. 16, 2003

(65) Prior Publication Data

US 2004/0137288 A1  Jul. 15, 2004

Related U.S. Application Data

(60) Provisional application No. 60/490,231, filed on Jul. 25, 2003, provisional application No. 60/419,653, filed on Oct. 18, 2002.

(51) Int. Cl.
*H01M 8/04* (2006.01)
*C07C 45/51* (2006.01)

(52) U.S. Cl. .......... 429/34; 502/331; 502/301; 502/345; 562/526; 562/539

(58) Field of Classification Search .......... 429/17, 429/19; 252/373; 423/651–653
See application file for complete search history.

(56) References Cited

U.S. PATENT DOCUMENTS

| | | | |
|---|---|---|---|
| 1,975,853 A | | 10/1934 | Lazier |
| 2,892,801 A | * | 6/1959 | Sargent ............ 502/301 |
| 3,184,417 A | | 5/1965 | Hort |
| 3,254,128 A | | 5/1966 | Hagemeyer, Jr. et al. |
| 3,454,364 A | | 7/1969 | Sturm et al. |
| 3,522,019 A | | 7/1970 | Buswell et al. |
| 3,960,898 A | * | 6/1976 | Hodge ............ 549/270 |
| 4,024,044 A | | 5/1977 | Brannan et al. |
| 4,086,877 A | * | 5/1978 | Henkel et al. ............ 123/1 A |
| 4,142,057 A | | 2/1979 | Suzuki |

(Continued)

FOREIGN PATENT DOCUMENTS

DE   195 34 433 C1   10/1996

(Continued)

OTHER PUBLICATIONS

Marino, F.J., E.G. Cerrella, S. Duhalde, M. Jobbagy, M.A. Laborde. Hydrogen from Steam Reforming of Ethanol. Characterization and Performance of Copper-Nickel Supported Catalysts. Int. J. Hydrogen Energy, vol. 23, No. 12, pp. 1095-1101. 1998.*

(Continued)

*Primary Examiner*—Patrick Ryan
*Assistant Examiner*—Alix Echelmeyer
(74) *Attorney, Agent, or Firm*—Senniger Powers LLP; James E. Davis

(57) ABSTRACT

This invention is directed to a process for reforming an alcohol. The process comprises contacting an alcohol with a reforming catalyst comprising copper at the surface of a metal supporting structure, preferably a metal sponge supporting structure comprising nickel. In a certain preferred embodiment, hydrogen produced by the reforming process is used as a fuel source for a hydrogen fuel cell to generate electric power, particularly for driving a vehicle.

73 Claims, 2 Drawing Sheets

U.S. PATENT DOCUMENTS

| | | | |
|---|---|---|---|
| 4,287,365 A | | 9/1981 | Becker et al. |
| 4,378,336 A | | 3/1983 | Yoon |
| 4,383,124 A | * | 5/1983 | de Graaf et al. ............. 568/485 |
| 4,782,183 A | | 11/1988 | Goto et al. |
| 4,820,594 A | * | 4/1989 | Sugita et al. ................... 429/17 |
| 5,220,055 A | | 6/1993 | Urano et al. |
| 5,292,936 A | | 3/1994 | Franczyk |
| 5,367,112 A | * | 11/1994 | Franczyk ..................... 562/526 |
| 5,398,663 A | * | 3/1995 | Kulasinghe ................. 123/549 |
| 5,536,694 A | | 7/1996 | Schuetz et al. |
| 5,627,125 A | | 5/1997 | Ebner et al. |
| 5,840,971 A | * | 11/1998 | Gubelmann-Bonneau ... 562/538 |
| 5,911,684 A | * | 6/1999 | Shnell ........................ 60/641.2 |
| 5,916,840 A | | 6/1999 | Ebner et al. |
| 5,928,614 A | | 7/1999 | Autenrieth et al. |
| 5,935,277 A | | 8/1999 | Autenrieth et al. |
| 6,077,620 A | * | 6/2000 | Pettit ........................... 429/26 |
| 6,155,212 A | | 12/2000 | McAlister |
| 6,209,494 B1 | | 4/2001 | Manikowski, Jr. et al. |
| 6,284,703 B1 | | 9/2001 | Ostgard et al. |
| 6,309,758 B1 | | 10/2001 | Schmidt |
| 6,376,708 B1 | | 4/2002 | Morgenstern et al. |
| 6,432,871 B1 | | 8/2002 | Bachinger et al. |
| 6,541,142 B1 | * | 4/2003 | Yu et al. ........................ 429/17 |
| 6,646,160 B2 | | 11/2003 | Franczyk, II et al. |
| 6,668,763 B2 | | 12/2003 | Anderson et al. |
| 6,686,075 B2 | | 2/2004 | Gieshoff et al. |
| 6,706,662 B2 | | 3/2004 | Morgenstern et al. |
| 6,794,331 B2 | | 9/2004 | Ostgard et al. |
| 6,818,720 B2 | | 11/2004 | Krauter et al. |
| 7,126,024 B2 | | 10/2006 | Morgenstern et al. |
| 2001/0018402 A1 | * | 8/2001 | Ostgard et al. ............... 502/345 |
| 2002/0019564 A1 | | 2/2002 | Morgenstern et al. |
| 2002/0099246 A1 | | 7/2002 | Siebenhaar et al. |
| 2004/0133045 A1 | | 7/2004 | Okanobori et al. |
| 2004/0191594 A1 | * | 9/2004 | Kearl ........................... 429/19 |
| 2004/0199019 A1 | | 10/2004 | Schmidt |
| 2005/0049434 A1 | | 3/2005 | Tustin et al. |

FOREIGN PATENT DOCUMENTS

| | | |
|---|---|---|
| EP | 0 648 534 A1 | 4/1995 |
| EP | 0 734 765 A1 | 10/1996 |
| EP | 0 920 064 A1 | 6/1999 |
| EP | 1662113 A2 | 5/2006 |
| EP | 1691065 A1 | 8/2006 |
| FR | 2 795 339 A1 | 12/2000 |
| JP | 63256136 A | 10/1988 |
| WO | 9527845 A1 | 10/1995 |
| WO | WO 00/32310 A1 | 6/2000 |
| WO | WO 01/00320 A1 | 1/2001 |
| WO | 2004035466 A1 | 4/2004 |

OTHER PUBLICATIONS

Safety data for tert-butyl alcohol [online]. May 23, 2006 [retrieved on Dec. 18, 2007]. Retrieved from the Internet:< URL: http://www.pcl.ox.ac.uk/MSDS/BU/tert-butyl_alcohol.html>.* de Wild et al. Catalytic production of hydrogen from methanol, Catalysis Today 60 (2000) pp. 3-10, available online Jul. 12, 2000.*

Agrell, Johan, et al., "Catalytic Hydrogen Generation from Methanol", The Royal Society of Chemistry, 2002, pp. 67-132, vol. 16.

Alejo, L., et al., "Partial Oxidation of Methanol to Produce Hydrogen over Cu-Zn-based Catalysts", Applied Catalysis A: General, 1997, pp. 281-297, vol. 162.

Amphlett, J.C., et al., "A Deactivation Model for Methanol-Steam Reformation on Cu/CnO/$Al_2O_3$ Catalyst for Optimizing the Production of Fuel-Cell Hydrogen", Studies in Surface Science and Catalysis, 2001, pp. 205-212, vol. 139.

Amphlett, J.C., et al., "On Board Hydrogen Purification for Steam Reformation/PEM Fuel Cell Vehicle Power Plants", International Journal of Hydrogen Energy, 1996, pp. 673-678, vol. 21, No. 8.

Appleby, A.J., "Fuel Cells Can Power Cleaner Buses and Cars, But Key Engineering and Economic Obstacls Will Delay Widespread Adoption of the Technology", The Electrochemical Engine for Vehicles, Scientific American, Jul. 1999, pp. 74-79.

Augustine, R.L., Catalytic Hydrogenation Techniques and Applications in Organic Synthesis, 1965, pp. 147-149, Marcel Dekker, Inc., New York City, NY.

Bauer, C.G., et al., "Effect of Hydrogen Addition on the Performance of Methane-Fuelced Vehicles. Part I: Effect on S.I. Engine Performance", International Journal of Hydrogen Energy, 2001, pp. 55-70, vol. 26.

Becker, H.J., et al., Scifinder Abstract for German Patent No. 2,713,374, (1977).

Black, F., "An Overview of the Technical Implications of Methanol and Ethanol as Highway Motor Vehicle Fuels", SAE Technical Paper Series, No. 912413, Oct. 1991, pp. 1-30.

Breen, J.P., et al., "Mechanistic Aspects of the Steam Reforming of Methanol over a CuO/ZnO/$ZrO_2$/$Al_2O_3$ Catalyst", Chem. Commun., 1999, pp. 2247-2248, The Royal Society of Chemistry, Cambridge, United Kingdom.

Bridgewater, A.J., et al., "Methanol Synthesis Over Raney Copper-Zinc Catalysts. II. Optimization of Alloy Composition and Catalyst Preparation", Applied Catalysis, 1983, pp. 369-382, vol. 7.

Cairns, J.F., et al., "Advances in ICI's Activated Cathode Technology for Chlor-Alkali Production", Advances in Mathematical Modeling and Simulation of Electrochemical Processes and Oxygen Depolarized Cathodes, 1998, pp. 289-296.

Cavallaro, S., et al., "Hydrogen Produced from Ethanol for Internal Reforming Molten Carbonate Fuel Cell", Journal of Power Sources, 2001, pp. 198-204, vol. 102.

Cheng, Wu-Hsun, "Development of Methanol Decomposition Catalysts for Production of $H_2$ and CO", Accounts of Chemical Research, 1999, pp. 685-691, vol. 32, No. 8.

Cheng, Wu-Hsun, "Reaction and XRD Studies on Cu Based Methanol Decomposition Catalysts: Role of Constituents and Development of High-Activity Multicomponent Catalysts", Applied Catalysis A: General, 1995, pp. 13-30, vol. 130.

Das, L.M., "Hydrogen Engines: A View of the Past and a Look into the Future", International Journal of Hydrogen Energy, 1990, pp. 425-443, vol. 15, No. 6.

Davis, G.W., et al., "Ethanol Vehicle Cold Start Improvement When Using a Hydrogen Supplemented E85 Fuel", Proc. Intersoc. Energy Convers. Eng. Con., 2000, pp. 303-308, vol. 1, No. 35.

Fatsikostas, A.N., "Steam Reforming of Biomass-Derived Ethanol for the Production of Hydrogen for Fuel Cell Applications", CHEMCOMM Communication, 2001.

Fierro, V., et al., "Oxidative Reforming of Biomass Derived Ethanol for Hydrogen Production in Fuel Cell Applications", Catalysis Today, 2002, pp. 141-144, vol. 75.

Freni, S., et al., "Hydrogen Production by Steam Reforming of Ethanol: A Two Step Process", React. Kinet. Catal. Lett., 2000, pp. 143-152, vol. 71, No. 1.

Gates, S.M., et al., "Bond Activation Sequence Observed in the Chemisorption and Surface Reaction of Ethanol on Ni(111)", Surface Science, 1986, pp. 111-134, vol. 171, North-Holland, Amsterdam.

Gersten et al., "Thermal Conductivity", The Physics and Chemistry of Material, 2001, p. 144, Wiley & Sons, New York City, New York.

Greiner, L., et al., "Engine Cold-Start with Dissociated Methanol", Proc. Int. Symp. Alcohol Fuels Technol., Issue CONF-790520, Paper III-50, 1979, NTIS, Springfield, Virginia (Abstract).

Günter, M.M., et al., "Redox Behavior of Copper Oxide/Zinc Oxide Catalysts in the Steam Reforming of Methanol Studied by in situ X-Ray Diffraction and Absorption Spectroscopy", Journal of Catalysis, 2001, pp. 133-149, vol. 203, No. 1.

Haga, F., et al., "Catalytic Properties of Supported Cobalt Catalysts for Steam Reforming of Ethanol", Catalysis Letters, 1997, pp. 223-227, vol. 48.

Huss, C., "Future Propulsion Systems and Fuels", Atomwirtschaft-Atomtechnik, December 2002, pp. 760-766, vol. 47, No. 12, Federal Republic of Germany (Abstract).

Idriss, H., et al., "Reactions of Acetaldehyde on $CeO_2$ and $Ceo_2$-Supported Catalysts", *Journal of Catalysis*, 1995, pp. 219-237, vol. 155.

Idriss, H., et al., "Reactions of Ethanol Over Metal Oxides", *Journal of Molecular Catalysis A: Chemical*, March 2000, pp. 201-212, vol. 152, Issues 1-2.

Iwasa, N., et al., "Reforming of Ethanol-Dehydrogenation to Ethyl Acetate and Steam Reforming to Acetic Acid Over Copper-Based Catalysts", *Bull. Chem. Soc. Jpn.*, 1991, pp. 2619-2623, vol. 64, The Chemical Society of Japan.

Jiang, C.J., et al., "Kinetic Mechanism for the Reaction Between Methanol and Water Over a $Cu-ZnO-Al_2O_3$ Catalyst", *Applied Catalysis A: General*, 1993, pp. 145-158, vol. 97.

Keller, J., et al., "Hydrogen Fueled Engines in Hybrid Vehicles", Society of Automotive Engineers, 2001, pp. 117-122.

Klouz, V., et al., "Ethanol Reforming for Hydrogen Production in a Hybrid Electric Vehicle: Process Optimisation", *Journal of Power Sources*, 2002, pp. 26-34, vol. 105.

Lieber, E., et al., "The Uses of Raney Nickel", pp. 417-455.

Lloyd, et al., Catalyst Handbook, 2nd Ed., 1996, pp. 309-312, M.V. Twigg Ed., Manson Publishing, London, England.

Luengo, C.A., et al., "A Novel Catalyst System for Ethanol Gasification", *International Journal of Hydrogen Energy*, 1992, pp. 677-681, vol. 17, No. 9.

Malakoff, D., "U.S. Supercars: Around the Corner, or Running on Empty?", *Science Magazine*, Jul. 30, 1999, pp. 680-685, vol. 285.

Mariño, F., et al., "Hydrogen Production from Steam Reforming of Bioethanol Using $Cu/Ni/K/\gamma-Al_2O_3$ Catalysts. Effect of Ni", *International Journal of Hydrogen Energy*, 2001, pp. 665-668, vol. 26.

Mariño, F., et al., "Steam Reforming of Ethanol Using Cu-Ni Supported Catalysts", *Studies in Surface Science and Catalysis*, 2000, pp. 2147-2152, vol. 130.

Matsumura, Y., et al., "Catalytic Methanol Decomposition to Carbon Monoxide and Hydrogen Over Nickel Supported on Silica", *Journal of Molecular Catalysis A: Chemical*, Mar. 2000, pp. 157-165, vol. 152, Issues 1-2.

Matthews, R.D., "Internal Combustion Engines", Chapter 59, Mechanical Engineers' Handbook, 2nd Ed, 1998, pp. 1801-1822.

Murcia-Mascarós, S., et al., "Oxidative Methanol Reforming Reactions on CuZnAl Catalysts Derived from Hydrotalcite-like Precursors", *Journal of Catalysis*, 2001, pp. 338-347, vol. 198.

Orchard, J.P., et al., "Preparation and Properties of Raney Nickel-Cobalt Catalysts", *Journal of Catalysis*, 1983, pp. 189-199, vol. 84.

Pettersson, L.J., "State of the Art of Multi-Fuel Reformers for Fuel Cell Vehicles: Problem Identification and Research Needs", *International Journal of Hydrogen Energy*, 2001, pp. 243-264, vol. 26.

Reitz, T.L., et al., "Methanol Reforming Over CuO/ZnO Under Oxidizing Conditions", *Studies in Surface Science and Catalysis*, 2000, pp. 3645-3650, vol. 130.

Reitz, T.L., et al., "Time-Resolved XANES Investigation of CuO/ZnO in the Oxidative Methanol Reforming Reaction", *Journal of Catalysis*, 2001, pp. 193-201, vol. 199.

Schmidt, S.R., "Surfaces of Raney® Catalysts", *Catalysis of Organic Reactions*, 1995, Scaros and Prunier eds., pp. 45-59.

Schoubye, P., "Methanation of CO on Some Ni Catalysts", *Journal of Catalysis*, 1969, pp. 238-246, vol. 14.

Sheng, P.-Y., et al., "$H_2$ Production from Ethanol over $Rh-Pt/CeO_2$ Catalysts: The Role of Rh for the Efficient Dissociation of the Carbon-Carbon Bond", *Journal of Catalysis*, 2002, pp. 393-403, vol. 208.

Sillitto, S.M.A., et al., "Electrochemical Testing and Structural Characterization of Nickel-based Catalytic Coatings Produced by Direct Spraying", Materials Research Society Symposium Proceedings, 1999, pp. 23-29.

Tromp, T.K., et al., "Potential Environmental Impact of a Hydrogen Economy on the Stratosphere", *Science Magazine*, Jun. 13, 2003, pp. 1740-1742, vol. 300.

Tu, Y.-J., et al., "Effect of Chromium Promoter on Copper Catalysts in Ethanol Dehydrogenation", *Journal of Chemical Technology and Biotechnology*, 1994, pp. 141-147, vol. 59; Issue 2 (Abstract).

Tullo, A. H., "A Fuel Cell in Every Car", C&EN Northeast New Bureau, Mar. 5, 2001, pp. 19-22.

Velu, S., et al., "Selective Production of Hydrogen for Fuel Cells Via Oxidative Steam Reforming of Methanol Over CuZnAl(Zr)-oxide Catalysts", *Applied Catalysis A: General*, May 14, 2001, pp. 47-63, vol. 213, Issue 1.

Wainwright, M.S., et al., "Raney Nickel-Copper Catalysts II. Surface and Pore Structures", *Journal of Catalysis*, 1980, pp. 124-131, vol. 64.

Wainwright, M.S., "Raney Copper and Raney Copper-Zinc Catalysts", *Chem. Ind.*, 1996, pp. 213-230, vol. 68.

Yee, A., et al., "A Study of the Reactions of Ethanol on $CeO_2$ and $Pd/CeO_2$ by Steady State Reactions, Termperature Programmed Desorpotion, and In Situ FT-IR", *Journal of Catalysis*, 1999, pp. 279-295, vol. 186.

Young, D.J., et al., "Raney Nickel-Copper Catalysts I. Structure and Leaching Properties", *Journal of Catalysis*, 1980, pp. 116-123, vol. 64.

BASF Catalyst for Daimler-Benz Car, *European Chemical News*, May 1998, p. 22.

EPRI Journal, May/Jun. 1997, pp. 8-17.

Hawley's Condensed Chemical Dictionary, 13th Ed., 1997, pp. 621-622, Rev. by R. J. Lewis, Sr., Van Nostrand Reinhold, New York City, NY.

Hawley's Condensed Chemical Dictionary, 13th Ed., p. 955, Rev. by R. J. Lewis, Sr., Van Nostrand Reinhold, New York City, NY, 1997.

Kirk-Othmer Encyclopedia of Chemical Technology, 4th Ed., pp. 258, 272 and 291, vol. 16, John Wiley & Sons, New York City, NY.

Perry's Chemical Engineers' Handbook, 6th Ed., p. 23-42 to 23-49, Krisher and Seibert, McGraw Hill, New York City, New York.

International Search Report, PCT/US03/32919, from the European Patent Office dated Mar. 19, 2004 (5 pages).

English language abstract for DE 195 34 433 obtained from http://www.espacenet.com.

English language abstract for FR 2 795 339 obtained from http://www.espacenet.com.

English language translation of DE 195 34 433 C1, pp. 1-8.

English language translation of FR 2 795 339, pp. 1-21.

Cracknell, R. F. et al., "Designing Fuels Compatible with Reformers and Internal Combustion Engines," SAE Paper 2004-01-1926, 2004.

Finegold, J.G., et al., "Reformed Methanol," Solar Energy Research Institute, 1982.

Finegold, J.G. et al., "Analysis of Dissociated Alcohol Internal Combustion Engine for Transportation," Solar Energy Research Institute, pp. 211-224, 1982.

Hirota, T., "Study of the Methanol-Reformed Gas Engine," JSAE Review, pp. 7-13, Mar. 1981.

Hofeldt, D.L., "Alternative Fuel Technologies for Heavy-Duty Vehicles: Performance, Emissions, Economics, Safety, and Development Status," SAE Paper 930731, 1993.

König, A. et al., "Engine Operation on Partially Dissociated Methanol," SAE Paper 850573, 1985.

Martin, M.D., "Gaseous Automotive Fuels from Steam Reformed Liquid Hydrocarbons," SAE Paper 780457, 1978.

Sakai, T. et al., "Transient Performance Development on Dissociated Methanol Fueled Passenger Car," SAE Paper 871169, 1987.

Sato, T. et al., "A Study on Reformed-Methanol Engine," SAE Paper 861237, 1986.

Shudo, T. et al., "Influence of Reformed Gas Composition on HCCI Combustion of Onboard Methanol-Reformed Gases," SAE Paper 2004-01-1908, 2004.

Shudo, T. et al., "Ignition Control by DME-Reformed Gas in HCCI Combustion of DME," SAE Paper 2003-01-1824, 2003.

Shudo, T. et al., "Influence of Hydrogen and Carbon Monoxide on HCCI Combustion of Dimethyl Ether," SAE Paper 2002-01-2828, 2002.

Tsolakis A. et al., "Catalytic Exhaust Gas Fuel Reforming for Diesel Engines—Effects of Water Addition on Hydrogen Production and Fuel Conversion Efficiency," Int. J. of Hydrogen Energy, vol. 29, pp. 1409-1419, 2004.

Tsolakis A. et al., "Low Temperature Exhaust Gas Fuel Reforming of Diesel Fuel," Fuel, vol. 83, pp. 1837-1845, 2004.

Tsolakis A. et al., "Exhaust Gas Assisted Reforming of Rapeseed Methyl Ester for Reduced Exhaust Emissions of CI Engines," Biomass & Bioenergy, vol. 27, pp. 493-505, 2004.

Tsolakis, A. et al., "Application of Exhaust Gas Fuel Reforming in Compression Ignition Engines Fueled by Diesel and Biodiesel Fuel Mixtures," Energy & Fuels, vol. 17, pp. 1464-1473, 2003.

Voecks, G.E. et al., "Operation of a Catalytic Methanol Decomposition Reactor for Vehicular Use," International Symposium on Alcohol Fuels Technology, Brasil, pp. 275-283, 1980.

Yamaguchi, I. et al., "Development Research on Dissociated Methanol Fueled Spark Ignition Engine," SAE Paper 852201 pp. 193-205, 1984.

Yap, D. et al., "Effect of Hydrogen Addition on Natural Gas HCCI Combustion," SAE Paper 2004-01-1972, 2004.

Yoo, S.J. et al., "Feasibility Evaluation of Reformed Methanol Usage to Spark Ignition Engine," SAE Paper 871166, 1987.

International Search Report from the European Patent Office in connection with International Application No. PCT/US2007/071131 dated February 21, 2008.

Choi, Y., et al., "Fuel Cell Grade Hydrogen from Methanol on a Commercial Cu/ZnO/Al2O3 Catalyst," Applied Catalysis B: Environmental, 2002, pp. 259-269, vol. 38.

Emonts, B., et al., "Fuel Cell Drive System with Hydrogen Generation in Test," Journal of Power Sources, 2000, pp. 228-236, vol. 86.

\* cited by examiner

USE OF METAL SUPPORTED COPPER CATALYSTS FOR REFORMING ALCOHOLS

CROSS-REFERENCE TO RELATED APPLICATIONS

This application claims the benefit of U.S. Provisional Application Ser. No. 60/490,231 filed Jul. 25, 2003 and U.S. Provisional Application Ser. No. 60/419,653 filed Oct. 18, 2002. The entire texts of U.S. Provisional Application Ser. No. 60/490,231 and U.S. Provisional Application Ser. No. 60/419,653 are incorporated herein by reference.

FIELD OF THE INVENTION

This invention generally relates to the dehydrogenation or reforming of alcohols. More particularly, this invention relates to a process for dehydrogenating a primary alcohol such as methanol or ethanol to produce hydrogen, particularly for use in a fuel cell for the production of electric power. The dehydrogenation process uses a copper-containing catalyst comprising a metal supporting structure.

BACKGROUND OF THE INVENTION

It is well known that contacting primary alcohols with a suitable catalyst at elevated temperatures (e.g., in excess of 200° C.) causes the alcohol to decompose to hydrogen gas and carbon-containing species. This process is generally known as "alcohol reforming." For example, methanol reforming leads to the formation of hydrogen and carbon monoxide as illustrated in the following Equation 1:

$$CH_3OH \rightarrow CO + 2H_2 \quad (1)$$

The hydrogen produced in the reforming process can then be supplied to a fuel cell in order to produce electric power. The reforming process is endothermic and requires efficient heat transfer to the catalyst, especially in transportation applications (e.g., electric automobiles) where high peak power is necessary, particularly at startup. Methanol reforming is described, for example, by Gunter et al., *J. Catal.* 203, 133-49 (2001); Breen et al., *J. Chem. Soc. Chem. Comm.*, 2247-48 (1999); *European Chemical News*, p. 22, (May 11, 1998); and Jiang et al., *Appl. Cat.* 97A, 145-58 (1993). Methanol reforming and particular application of methanol reforming as a source of hydrogen for fuel cells is described, for example, by Agrell et al., *Catalysis-Specialist Periodical Reports*, vol. 16, pp. 67-132 (J. J. Spivey, ed., Royal Society of Chemistry, Cambridge, UK, 2002).

It is important to note that carbon monoxide is generally toxic to fuel cell electrodes. For example, fuel cell performance and power economy is typically reduced as the level of carbon monoxide exceeds about 20 ppm in the hydrogen feed. See, Pettersson et al., *Int'l J. Hydrogen Energy*, vol. 26, p. 246 (2001). It is therefore desirable to convert carbon monoxide to carbon dioxide by reaction with steam as illustrated in the following Equation 2:

$$CO + H_2O \rightarrow CO_2 + H_2 \quad (2)$$

This conversion is known as the water-gas shift reaction and is widely practiced commercially. A description of catalysts, processes and applications of the water-gas shift reaction can be found, for example, in *Catalyst Handbook*, pp. 283-339 (2nd ed., M. V. Twigg ed., Manson Publishing, London, 1996).

Under conditions similar to those described above with respect to methanol, the reforming of ethanol initially produces acetaldehyde which can then be decomposed (i.e., decarbonylated) to carbon monoxide and methane as illustrated in the following Equation 3:

$$CH_3CH_2OH \rightarrow CH_3C(O)H + H_2 \rightarrow CO + CH_4 + H_2 \quad (3)$$

As with methanol reforming, ethanol reforming is preferably coupled with the water-gas shift reaction to convert carbon monoxide to carbon dioxide and produce additional hydrogen. Thus, the water-gas shift reaction associated with ethanol reforming produces carbon dioxide, methane and hydrogen as illustrated in the following Equation 4:

$$CO + CH_4 + H_2 + H_2O \rightarrow CO_2 + CH_4 + 2H_2 \quad (4)$$

The most common catalysts for alcohol dehydrogenation and low temperature water-gas shift reactions comprise copper with zinc oxide and sometimes other promoters on a refractory supporting structure, generally alumina or silica. Copper-zinc oxide catalysts, while exhibiting excellent stability for methanol synthesis, have been reported to have inadequate stability for methanol reforming, as described by Cheng, *Appl. Cat. A*, 130, p. 13-30 (1995) and Amphlett et al., *Stud. Surf. Sci. Catal.*, 139, p. 205-12 (2001).

Most other catalysts reported to be active for alcohol reforming have consisted of metal oxides, usually containing catalytic metals. Yee et al., *J. Catal.* 186, 279-95 (1999) and Sheng et al., *J. Catal.* 208, 393-403 (2002) report ethanol reforming over $CeO_2$ by itself or with additional rhodium, platinum or palladium. However, these papers report that ethanol can decompose to a number of unwanted by-products such as acetone, ketene and butene.

Copper-nickel catalysts are known to have a high activity for the dehydrogenation of ethanol. For example, copper-nickel catalysts supported on alumina are active for ethanol reforming. Ethanol reforming over copper-nickel catalysts is described by Mariño et al. in *Stud. Surf. Sci. Catal.* 130C, 2147-52 (2000) and Freni et al. in *React. Kinet. Catal. Lett.* 71, 143-52 (2000). Although the references described the catalysts as providing good selectivity for acetaldehyde decarbonylation, each of the references suffered from incomplete conversion and minimal water-gas shift activity at temperatures of 300° C. Further, conventional ethanol reforming catalysts tend to quickly deactivate due to the deposition of carbon on the surface, a process known as coking. At temperatures above 400° C., coking is accelerated by the presence of acid sites on the surface of the catalyst, which promote the dehydration of ethanol to ethylene which then polymerizes. The problem of coking involved with ethanol reforming catalysts is described, for example, by Haga et al. in *Nippon Kagaku Kaishi*, 33-6 (1997) and Freni et al., in *React. Kinet. Catal. Lett.*, 71, p. 143-52 (2000).

Accordingly, a need persists for improved alcohol dehydrogenation catalysts and processes capable of reforming alcohols at moderate reaction temperatures and with adequate conversion.

SUMMARY OF THE INVENTION

Among certain objects of the present invention, therefore, are the provision of a novel and improved process for dehydrogenating alcohols to form hydrogen, particularly such a process which uses a catalyst that has a higher density than prior art alcohol reforming catalysts; an improved process which uses an alcohol reforming catalyst providing better thermal conductivity for supporting the endothermic reaction; an improved process which uses a catalyst without acid sites; an improved process which uses a catalyst having high activity and increased stability for the conversion of acetaldehyde to methane and carbon monoxide at moderate temperature; an improved process which produces a hydrogen-containing product mixture suitable for use in a fuel cell for the production of electric power; and a novel and practical method for generating power from ethanol at reforming temperatures below about 400° C., which allows for a simplified power system requiring fewer costly hydrogen fuel cell units and provides improved energy efficiency.

Briefly, therefore, the present invention is directed to a process for reforming an alcohol. The process comprises contacting an alcohol with a reforming catalyst comprising copper at the surface of a metal supporting structure. In a preferred embodiment, the reforming catalyst comprises copper at the surface of a metal sponge supporting structure, preferably a metal sponge comprising nickel or a metal sponge comprising nickel and copper.

The present invention is further directed to a process for reforming ethanol. The process comprises contacting a feed gas mixture comprising ethanol with a reforming catalyst at a temperature of below about 400° C. to produce a reforming product mixture comprising hydrogen. The reforming catalyst comprises copper at the surface of a metal supporting structure. In a preferred embodiment, the process comprises contacting the feed gas mixture comprising ethanol with a catalyst comprising copper at the surface of a nickel support at a temperature of less than about 350° C.

The present invention is further directed to a process for producing electric power from a fuel cell. The process comprises contacting a feed gas mixture comprising ethanol with a dehydrogenation catalyst in a dehydrogenation reaction zone to produce a product mixture comprising hydrogen. The dehydrogenation catalyst comprises copper at the surface of a metal supporting structure. Hydrogen from the product mixture and oxygen are introduced into a fuel cell to produce electric power and a fuel cell effluent comprising methane. The fuel cell effluent is introduced into a combustion chamber and combusted in the presence of oxygen.

In a further embodiment, the present invention is directed to an improved copper plating procedure for the preparation of the dehydrogenation catalyst.

Other objects and features of this invention will be in part apparent and in part pointed out hereinafter.

DESCRIPTION OF THE PREFERRED EMBODIMENTS

Figure 1:
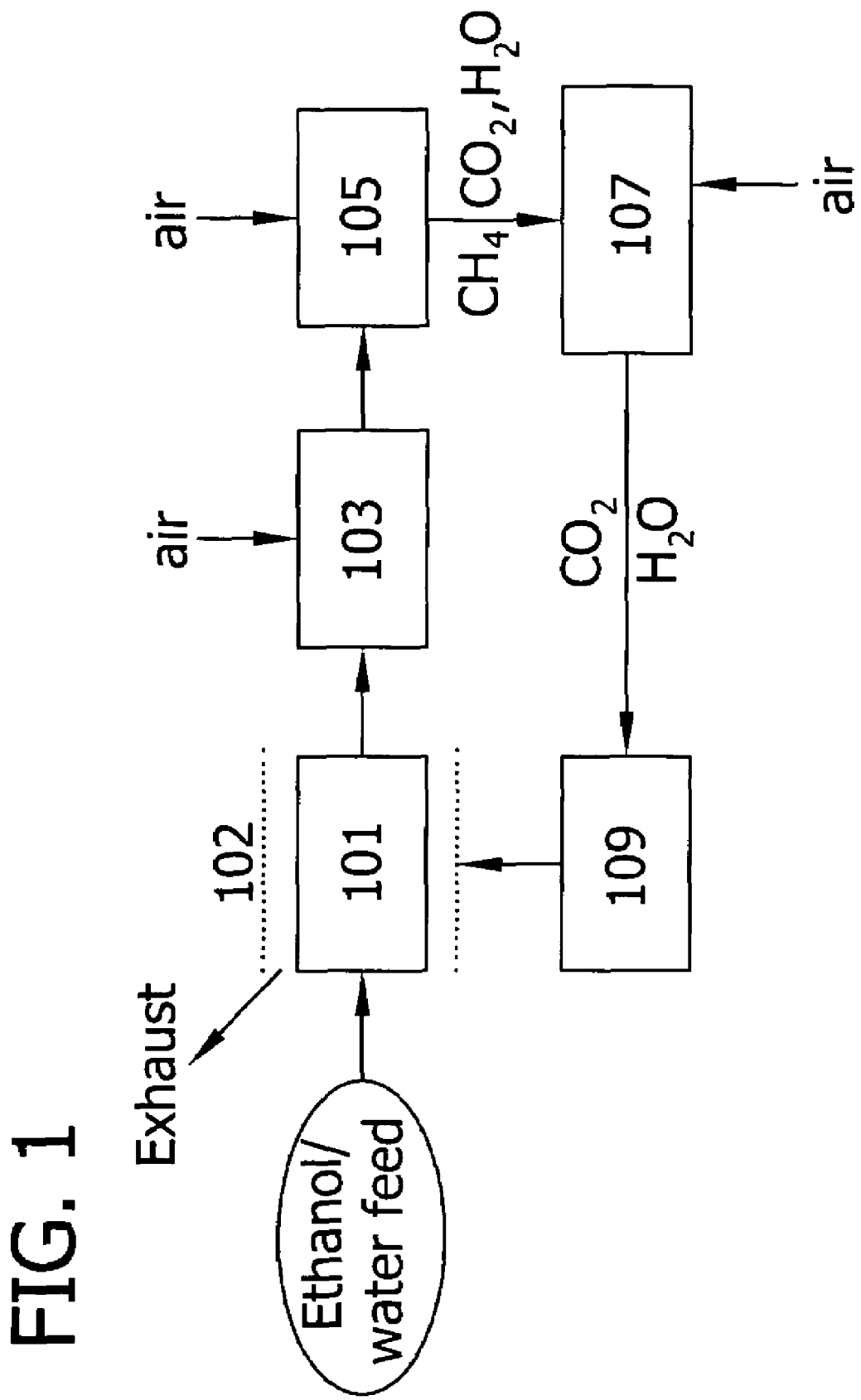
FIG. 1 is a schematic of a power system in accordance with one embodiment of the present invention wherein the hydrogen-containing product mixture produced in reforming the alcohol is introduced as a fuel source to a hydrogen fuel cell to generate electric power.

In accordance with the present invention, mixtures of copper and other metals, particularly mixtures of copper and nickel, are used as catalysts for the dehydrogenation (i.e., reforming) of alcohols. It has been discovered that copper-containing catalysts comprising a metal supporting structure, for example, a catalyst prepared by depositing copper onto a nickel sponge supporting structure, show increased activity as catalysts in gas-phase reforming of primary alcohols such as methanol and ethanol. The catalysts used in the practice of the present invention are more stable in and particularly active for the thermal decomposition of ethanol into hydrogen, methane, carbon monoxide and carbon dioxide at moderate temperature. The hydrogen produced can be used, for example, to generate power by the conversion of hydrogen to water in a fuel cell, and the combustion of methane, along with any residual hydrogen in the gas stream exiting the fuel cell. The combustion process can either drive a generator to produce additional electric power or be utilized in an internal combustion engine to generate mechanical power. Such a power system provides a convenient method for obtaining power from ethanol with the further advantages that the combustion can be used to minimize undesired emissions while providing heat to the reformer catalyst bed. More generally, the product mixture produced in reforming primary alcohols in accordance with the present invention may be used as a source of hydrogen and/or carbon monoxide in chemical process applications (e.g., carbonylation, hydrogenation, and hydroformylation) and materials processing applications. In addition, the alcohol reforming catalyst described herein may be used to produce a product mixture comprising hydrogen and carbon monoxide known as synthesis gas from an alcohol feedstock.

A. Catalyst

In one embodiment of the invention, the alcohol dehydrogenation or reforming catalyst comprises a copper-containing active phase at the surface of a metal supporting structure comprising copper and/or one or more non-copper metals. The catalyst generally comprises at least about 10% by weight copper, preferably from about 10% to about 90% by weight copper and more preferably from about 20% to about 45% by weight copper. The catalyst may comprise a substantially homogeneous structure such as a copper sponge, a copper-containing monophasic alloy or a heterogenous structure having more than one discrete phase. Thus, the copper-containing active phase may be present at the surface of the supporting structure as a discrete phase such as a copper coating or an outer stratum; as a surface stratum, or as part of a homogeneous catalyst structure. In the case of a copper-containing active phase comprising a discrete phase at the surface of the supporting structure, the metal supporting structure may be totally or partially covered by the copper-containing active phase. For example, in a particularly preferred embodiment as described below, the catalyst comprises a copper-containing active phase at the surface of a metal sponge supporting structure comprising nickel. Such catalysts comprise from about 10% to about 80% by weight copper and more preferably from about 20% to about 45% by weight copper. The balance of the catalyst preferably consists of nickel and less than about 10% aluminum or other metals by weight. Further, in preferred embodiments wherein the metal supporting structure comprises nickel, it is important to note that copper and nickel are miscible in all proportions. Thus, catalysts comprising a copper-containing active phase at the surface of a nickel supporting structure may not necessarily have a phase boundary between the copper-containing active phase and the supporting structure.

As is common in catalysis, the activity of the dehydrogenation catalyst is improved by increasing the surface area. Thus, it is typically preferred for the freshly-prepared catalyst to have a surface area of at least about 10 $m^2/g$ as measured by the Brunauer-Emmett-Teller (BET) method. More preferably, the catalyst has a BET surface area of from about 10 $m^2/g$ to about 100 $m^2/g$, even more preferably the catalyst has a BET surface area of from about 25 m²/g to about 100 m²/g, and still more preferably the catalyst has a BET surface area of from about 30 m²/g to about 80 m²/g.

In a certain preferred embodiment for the reforming of ethanol, the surface of the catalyst preferably contains an amount of nickel atoms which promote the decarbonylation of aldehydes such as acetaldehyde. Preferably, the surface comprises from about 5 to about 100 μmol/g of nickel as measured by the method described in Schmidt, "Surfaces of Raney® Catalysts," in *Catalysis of Organic Reactions*, pp. 45-60 (M. G. Scaros and M. L. Prunier, eds., Dekker, New York, 1995). More preferably, the surface nickel concentration is from about 10 μmol/g to about 80 μmol/g, most preferably from about 15 μmol/g to about 75 μmol/g.

1. Supporting Structure

The supporting structure of the alcohol dehydrogenation catalyst comprises a metal. Suitable metal supporting structures may comprise a wide variety of structures and compositions. Preferably, the supporting structure comprises a metal having a tensile strength and/or yield strength greater than copper. Thus, in accordance with a preferred embodiment, the supporting structure comprises a non-copper metal. The non-copper metal may comprise a single metal or multiple metals. In such a preferred embodiment, at least about 10% by weight of the metal supporting structure is non-copper metal. In one particularly preferred embodiment, at least about 50% (more preferably at least about 65%, at least about 80%, at least about 85% or even at least about 90%) by weight of the metal supporting structure is non-copper metal. In another particularly preferred embodiment, the supporting structure comprises at least about 10% by weight non-copper metal and at least about 50% (more preferably from about 60% to about 80%) by weight copper.

The metal or alloy from which the metal supporting structure is made preferably has a tensile strength and/or yield strength which is greater than copper alone. It is particularly preferred for the composition to have a yield strength of at least about 70 MPa, more preferably at least about 100 MPa, and even more preferably at least about 110 MPa. It is also particularly preferred for the composition to have a tensile strength of at least about 221 MPa, more preferably at least about 275 MPa, and even more preferably at least about 300 MPa. For example, a composition containing 90% by weight copper and 10% by weight nickel reportedly has a yield strength of 110 MPa and a tensile strength of 303 MPa; a composition containing 70% by weight copper and 30% by weight nickel reportedly has a yield strength of 138 MPa and a tensile strength of 372 MPa; and a composition containing 70% by weight copper and 30% by weight zinc reportedly has a yield strength of 124 MPa and a tensile strength of 331 MPa. See Krisher and Siebert, *Perry's Chemical Engineers' Handbook*, pp. 23-42 to 23-49 (6th ed., McGraw Hill, New York, N.Y. 1984).

Preferably, the non-copper metal of the metal supporting structure is selected from the group consisting of nickel, cobalt, zinc, silver, palladium, gold, tin, iron and mixtures thereof. More preferably, the metal supporting structure comprises nickel. Nickel is typically most preferred because, for example: (1) nickel is relatively inexpensive compared to other suitable metals such as palladium, silver and cobalt, (2) combinations of nickel and copper have been shown to promote the decarbonylation of acetaldehyde to methane and carbon monoxide, and (3) depositing copper onto a nickel-containing supporting structure is typically less difficult relative to depositing copper onto a supporting structure containing a significant amount of the other suitable metals. For example, copper may be deposited onto a nickel-containing supporting structure using the simple process of electrochemical displacement deposition. There are, however, other techniques (e.g., electroless plating and metal-organic chemical vapor deposition) which may be used to deposit copper onto supporting structures comprising other suitable non-copper metals.

It is often desirable to deposit copper onto the surface of the metal supporting structure using electrochemical displacement deposition (also described in the art as "immersion plating") as described in greater detail below. In that case, the metal supporting structure preferably contains metal which has a reduction potential to the metal which is less than the reduction potential to the metal of copper, i.e., a reduction potential to the metal of less than about +343 mVolts vs. NHE (normal hydrogen electrode). Non-copper metals having such a reduction potential include, for example, nickel, zinc, tin, iron, and cobalt. The presence of such a metal near the surface of the supporting structure allows for simple deposition of copper metal at the surface of the supporting structure by contacting the surface with a copper salt (normally a Cu(II) salt) solution. More specifically, during electrochemical displacement deposition, such a metal near the surface of the supporting structure tends to oxidize (and go into solution as an ion) when contacted with a copper ion solution. As this occurs, the copper ions in solution near the supporting structure surface are reduced to copper metal, which, in turn, deposits on the surface of the supporting structure. The reaction which occurs, for example, when a supporting structure comprising nickel is contacted with a copper salt solution is illustrated in the following Equation 5:

$$Cu^{2+} + Ni^0 \rightarrow Cu^0 + Ni^{2+} \qquad (5)$$

As the foregoing suggests, when the catalyst is prepared by depositing copper onto the surface of the supporting structure using electrochemical displacement deposition, it is particularly preferable to use a nickel-containing supporting structure because nickel has at least four desirable characteristics: (1) a reduction potential to the metal which is less than the reduction potential to the metal of copper, (2) relative stability in the alcohol dehydrogenation reaction conditions of this invention, (3) greater mechanical strength and resistance to attrition than copper, and (4) nickel/copper catalysts promote the decarbonylation of acetaldehyde to carbon monoxide and methane.

When the metal supporting structure comprises more than one metal, it is preferred that at least about 80% by weight (more preferably at least about 85% by weight, even more preferably at least about 90% by weight, and still even more preferably essentially all) of the metals in the supporting structure are in the form of an alloy. In a particularly preferred embodiment, the metals form a substitutional alloy (also known as a "monophasic alloy"), wherein the alloy has a single, continuous phase. Multiphasic alloys (i.e., alloys comprising at least 2 discrete phases) may also be used as supporting structures. In embodiments wherein the copper-containing active phase is deposited onto a copper-containing multiphasic alloy supporting structure, copper tends to preferentially coat the copper-rich portions of a multiphasic supporting structure surface relative to the copper-poor portions of the surface. Whether the alloy is monophasic or multiphasic will depend on the components of the alloy and their concentrations. Typically, for example, metal supporting structures consisting essentially of nickel and copper are monophasic at any nickel concentration. But, for example, when the supporting structure consists essentially of copper and zinc, there are many zinc concentrations (typically, concentrations greater than about 35% by weight) which lead to the alloy being biphasic.

It should be recognized that the supporting structure may also comprise non-metal atoms (e.g., boron, carbon, silicon, nitrogen, phosphorus, etc.) in addition to the metal atoms. An alloy containing such non-metal is typically described in the art as an "interstitial alloy." Supporting structures comprising such an alloy may have various advantages, such as enhanced mechanical strength. Typically, however, catalysts comprising an interstitial alloy contain at least about 70% by weight metal.

In an especially preferred embodiment, the supporting structure is a metal sponge comprising copper and/or one or more of the suitable non-copper metals listed above. As used herein, the term "metal sponge" refers to a porous form of metal or metal alloy having a BET surface area of at least about 10 $m^2/g$. Preferred metal sponge supporting structures have a BET surface area of at least about 20 $m^2/g$, more preferably at least about 35 $m^2/g$, even more preferably at least about 50 $m^2/g$, and still more preferably at least about 70 $m^2/g$. It has been found in accordance with this invention that a copper-containing active phase at the surface of a metal sponge supporting structure results in a material exhibiting the mechanical strength, high surface area, high thermal conductivity and density of the sponge supporting structure combined with the desired catalytic activity of the copper.

The metal sponge support and the resulting catalyst may be in the form of a powder or a pellet. Further, the alcohol dehydrogenation catalyst may be used in the form of a monolith produced by incorporating the catalyst of the invention onto the surface of a suitable foraminous substrate (e.g., honeycomb). Generally, catalyst in the form of pellets and monoliths are preferred to minimize back pressure in the reformer as described below. Further, monolithic catalysts may be more stable against mechanical degradation caused by vibration (e.g., in a vehicular application) and/or chemical attack in the reaction medium.

It is important to note that when the catalyst of the invention is used in the form of a pellet or monolith, it is contemplated that only a portion of the pellet or monolith may comprise the metal sponge for supporting the copper-containing active phase. That is, the alcohol reforming catalyst may comprise a nonporous substrate to provide strength and shape to a fixed bed or monolithic catalyst while still providing one or more porous (i.e., metal sponge) regions having a BET surface area of at least about 10 $m^2/g$ for supporting the copper-containing active phase. Suitable nonporous materials for use as fixed bed or monolithic substrates generally may include any material that is thermally and chemically stable under plating and reforming conditions. Although non-metal substrates may be used, metal substrates such as stainless steel, copper, nickel, cobalt, zinc, silver, palladium, gold, tin, iron and mixtures thereof are typically more preferred.

When the metal sponge support is in the form of a powder, the preferred average particle size of the metal sponge is at least about 0.1 μm, preferably from about 0.5 to about 100 μm, more preferably from about 15 to about 100 μm, even more preferably from about 15 to about 75 μm, and still even more preferably from about 20 to about 65 μm. When the catalyst is in the form of a pellet or a monolith, the dimensions of the pellet or the monolithic substrate upon which the catalyst of the present invention is incorporated, as well as the size of the foramenal openings in any such monolithic structure, may vary as needed in accordance with the design of the reformer as understood by those skilled in the art.

Metal sponge supporting structures can be prepared by techniques generally known to those skilled in the art. See, generally, Lieber and Morritz, *Adv. Catal.*, 5, 417 (1953) (a general review directed to sponge metals). See also, *Hawley's Condensed Chemical Dictionary*, 13th Ed., p. 621 (Rev. by Richard J. Lewis, Sr., Van Nostrand Reinhold, New York, N.Y. 1997) (describing a method for preparing an iron sponge).

References describing the preparation of nickel sponges include, for example, Augustine, Robert L., *Catalytic Hydrogenation Techniques and Applications in Organic Synthesis*, appendix at pp. 147-49 (Marcel Dekker, Inc., 1965). See also, *Hawley's Condensed Chemical Dictionary*, 13th Ed., p. 955 (Rev. by Richard J. Lewis, Sr., Van Nostrand Reinhold, New York, N.Y. 1997) (describing the generally recognized technique of making sponge nickel by leaching aluminum from an alloy containing 50% by weight nickel and 50% by weight aluminum using a 25% by weight caustic soda solution). In the case of nickel sponges, the metal supporting structure is preferably substantially free of unactivated regions and has been washed substantially free of aluminum oxides. Unreacted aluminum will tend to react with steam under reforming conditions to form aluminum oxides which can obstruct diffusion and provide acid sites for ethanol dehydration.

References describing the preparation of copper/zinc sponges include, for example, Bridgewater et al., *Appl. Catal.*, 7, 369 (1983). Such references also include, for example, M. S. Wainwright, "Raney Copper and Raney Copper-Zinc Catalysts," *Chem. Ind.* (Dekker), 68, 213-30 (1996).

References describing the preparation of nickel/iron sponges include, for example, Becker and Schmidt, "Raney nickel-iron catalyst," *Ger. Offen.* DE 2713374 19780928 (1978).

References describing the preparation of nickel/cobalt sponges include, for example, Orchard et al., "Preparation and Properties of Raney Nickel-Cobalt Catalysts," *J. Catal.*, 84, 189-99 (1983).

In accordance with one preferred embodiment, the supporting structure comprises a nickel/copper sponge (i.e., a copper-doped nickel sponge or a nickel-doped copper sponge) as described in co-assigned U.S. Pat. No. 6,376,708. References describing the preparation of nickel/copper sponges also include, for example, Young et al., *J. Catal.*, 64, 116-23 (1980) and Wainwright and Anderson, *J. Catal.*, 64, 124-31 (1980).

Suitable metal sponges include the material available from W.R. Grace & Co. (Davison Division, Chattanooga, Tenn.) under the trademark RANEY as well as materials generally described in the art as "Raney metals," irrespective of source. Raney metals may be derived, for example, by leaching aluminum from an alloy of aluminum and a base metal (e.g., nickel, cobalt, copper) with caustic soda solution. Various metal sponges are also commercially available from, for example, Gorwara Chemical Industries (Udaipur, India); Activated Metals & Chemicals, Inc. (Sevierville, Tenn.); Degussa-Huls Corp. (Ridgefield Park, N.J.); Engelhard Corp. (Iselin, N.J.); and Aldrich Chemical Co. (Milwaukee, Wis.).

In accordance with another preferred embodiment, the supporting structure comprises a nickel sponge. Examples of suitable commercially-available nickel sponges, for example, include RANEY 2800 (characterized by the manufacturer as having at least 89 wt. % Ni; no greater than 9.5 wt. % Al; no greater than 0.8 wt. % Fe; an average particle size in the range of 20-60 μm; a specific gravity of approximately 7; and a bulk density of 1.8-2.0 kg/l (15-17 lbs/gal) based on a catalyst slurry weight of 56% solids in water), RANEY 4200 (characterized by the manufacturer as having at least 93 wt. % Ni;

no greater than 6.5 wt. % Al; no greater than 0.8 wt. % Fe; an average particle size in the range of 20-50 µm; a specific gravity of approximately 7; and a bulk density of 1.8-2.0 kg/l (15-17 lbs/gal) based on a catalyst slurry weight of 56% solids in water), RANEY 4310 (characterized by the manufacturer as having at least 90 wt. % Ni; no greater than 8 wt. % Al; 0.5-2.5 wt. % Mo; no greater than 0.8 wt. % Fe; an average particle size in the range of 20-50 µm; a specific gravity of approximately 7; and a bulk density of 1.8-2.0 kg/l (15-17 lbs/gal) based on a catalyst slurry weight of 56% solids in water), RANEY 3110 (characterized by the manufacturer as having at least 90 wt. % Ni; 0.5-1.5 wt. % Mo; no greater than 8.0 wt. % Al; no greater than 0.8 wt. % Fe; an average particle size in the range of 25-65 µm; a specific gravity of approximately 7; and a bulk density of 1.8-2.0 kg/l (15-17 lbs/gal) based on a catalyst slurry weight of 56% solids in water), RANEY 3201 (characterized by the manufacturer as having at least 92 wt. % Ni; no greater than 6 wt. % Al; no greater than 0.8 wt. % Fe; 0.5-1.5 wt. % Mo; an average particle size in the range of 20-55 µm; a specific gravity of approximately 7; and a bulk density of 1.8-2.0 kg/l (15-17 lbs/gal) based on a catalyst slurry weight of 56% solids in water), RANEY 3300 (characterized in U.S. Pat. No. 5,922,921 as having 90-99.1 wt. % Ni; no greater than 8.0 wt. % Al; no greater than 0.8 wt. % Fe; 0.5-1.5 wt. % Mo; an average particle size in the range of 25-65 µm; a specific gravity of approximately 7; and a bulk density of 1.8-2.0 kg/l (15-17 lbs/gal) based on a catalyst slurry weight of 56% solids in water), RANEY 2724 (Cr-promoted), and RANEY 2724 (Cr-promoted), all sold by W.R. Grace & Co.; the catalyst described as "Raney nickel" sold by Gorwara Chemical Industries; A-4000 and A-5000, sold by Activated Metals & Chemicals, Inc.; nickel ABMC, sold by Degussa-Huls Corp.; and "Raney nickel," Catalog No. 22, 167-8, sold by Aldrich Chemical Co.

Examples of fixed bed substrates including a metal sponge supporting structure include the nickel sponge pellets described in European Patent No. EP 0 648 534 A1 and U.S. Pat. No. 6,284,703, the disclosures of which are incorporated herein by reference. Nickel sponge pellets, particularly for use as fixed bed catalysts, are available commercially, for example, from W.R. Grace & Co. (Chattanooga, Tenn.) and Degussa-Huls Corp. (Ridgefield Park, N.J.).

2. Deposition of the Copper-Containing Active Phase

The copper-containing active phase may be deposited at the surface of a metal supporting structure using various techniques well-known in the art for depositing metal onto metal surfaces. These techniques include, for example, liquid phase methods, such as electrochemical displacement deposition and electroless plating; and vapor phase methods such as physical deposition and chemical deposition. Suitable methods for depositing copper at the surface of a metal supporting structure are described in co-assigned U.S. Pat. No. 6,376,708, and co-assigned and co-pending U.S. patent application Ser. No. 09/832,541, published as US-2002-0019564-A1. The entire texts of U.S. Pat. No. 6,376,708 and U.S. Publication No. US-2002-0019564-A1 are incorporated herein by reference.

It is important to note that copper is at least partially miscible with most supporting structure metals of interest and is completely miscible with nickel. Thus, it has been found that the copper deposition process may result in the catalyst having copper, or more particularly a copper-containing active phase, at the surface of the supporting structure as part of a discrete phase such as an outer stratum or coating, at the surface of the supporting structure as part of a surface stratum, or the copper may migrate from the surface of the supporting structure into the bulk of the supporting structure. Without being held to a particular theory, it is believed that the catalyst surface can move, sinter or otherwise restructure during the reaction conditions of the deposition and alcohol reforming processes resulting in such variations of form in the copper-containing active phase. Nonetheless, it has been found that the copper deposition process results in an overall increase in the copper content of the catalyst with the deposited copper predominantly present at or near the surface of the freshly prepared catalyst, which is richer in copper than before deposition.

a. Electrochemical Displacement Deposition of Copper

As mentioned above, copper may be deposited onto the surface of the metal supporting structure via electrochemical displacement deposition wherein copper ions in a copper-salt solution in contact with the supporting structure are reduced to copper metal as non-copper metal near the surface of the supporting structure is oxidized. The copper metal, in turn, forms a coating on the surface of the supporting structure, while the non-copper ions go into solution. A general discussion related to electrochemical displacement deposition may be found in, for example, Krulik and Mandich, "Metallic Coatings (Survey)", *Kirk-Othmer Encyclopedia of Chemical Technology*, 4th Ed., Vol. 16, pp. 258-91 (J. I. Kroschwitz and M. Howe-Grant, eds., Wiley, New York, N.Y., 1995). More particular discussion of the electrochemical displacement deposition of copper onto a metal sponge supporting structure may be found in co-assigned U.S. Pat. No. 6,376,708, which is incorporated herein by reference.

In a particularly preferred method for the deposition of copper onto a metal supporting structure, electrochemical displacement deposition is conducted under basic conditions followed by electrochemical displacement deposition under acidic conditions. In a similar particularly preferred embodiment, no copper is added in the acidic step, but copper redeposition occurs as monovalent copper already deposited on the support during the basic step dissolves and redeposits. This procedure is described in Example 6 below. Preferably, the metal supporting structure is substantially free of surface oxidation at the time of the copper deposition. In instances where the metal supporting structure has an oxidized surface (e.g., when the supporting structure has been exposed to air (even while under water) for 6 or more months), it is particularly preferable to pre-treat the supporting structure with a reducing agent. For example, the supporting structure may be stirred in a sodium borohydride solution, which preferably comprises at least about 1 gram of sodium borohydride per 25 grams of metal supporting structure and has a pH of at least about 10. Generally, contacting the supporting structure with the reducing agent for about 5 minutes to about 2 hours at room temperature is sufficient to substantially free the supporting structure of surface oxidation.

To begin the two-step, basic/acidic electrochemical displacement deposition, the metal supporting structure is slurried into a water or alcohol solution, preferably in water, and the pH is adjusted to 7. A copper salt is added to the metal supporting structure slurry, preferably as a solution comprising the copper salt and a chelator, particularly an amine chelator such as EDTA. Preferably, the copper salt solution contains about 10% to about 30% copper by weight with respect to the metal supporting structure. Without providing an exhaustive list, suitable copper salts for displacement deposition include, for example, the nitrate, sulfate, chloride, and acetate salts of copper. Salts containing copper in the divalent state (i.e., Cu(II)) are typically the most preferred. Although salts containing monovalent and trivalent copper may be used, they are typically less preferred because they tend to be unstable, commercially less available, and/or insoluble in the alkaline mixture.

A solution of an alkali metal hydroxide (such as NaOH) or another suitable base is then slowly added to the slurry, preferably with continuous stirring and nitrogen sparging. The alkali metal hydroxide solution preferably contains at least one molar equivalent of alkali metal hydroxide with respect to the copper salt, and more preferably from about 1.1 to about 1.6 molar equivalents of alkali metal hydroxide with respect to the copper salt. Although this step comprises a displacement deposition reaction, a portion of the oxidized metal from the supporting structure remains closely associated with the supporting structure and is removed in the subsequent acidic step. Moreover, the first, basic displacement deposition reaction results in the deposition of cuprous oxide ($Cu_2O$) as well as metallic copper at the surface of the supporting structure.

After the basic displacement deposition, the supernatant is removed by decanting or other means and copper is further deposited onto the surface of the catalyst supporting structure under acidic conditions. After decantation, the metal supporting structure is again slurried into an alcohol or water solution. An acid buffer solution is added to the metal supporting structure slurry to reduce the pH to below about 4. The temperature of the buffer is preferably between about 40° C. and about 90° C. The acid buffer may comprise any suitable chelator which is capable of controlling residual metals in solution while subsequently lowering pH. More particularly, the acid buffer preferably has a pKa of from about 1 to about 4 in order to maintain a pH in the plating bath of from about 1 to about 4. Preferably, the acid buffer solution is a gluconic acid/gluconate buffer. Gluconic acid is preferred for depositing copper onto the surface of metal supporting structures comprising nickel because gluconic acid is a good chelator for residual aluminum ions present in solution. Further, it is important to note that the use of buffers based on phosphoric acid are generally less preferred because of the risk of forming insoluble phosphate precipitates. A copper salt as described above may then be added to the metal supporting structure slurry, preferably as a copper salt solution, over a period of about 5 to about 40 minutes with continuous stirring and nitrogen sparging. Preferably, as described in Example 6, from about 0.2 to about 0.4 molar equivalents of sulfuric acid is added instead of a copper salt solution. This procedure leads to improved activity for the water-gas shift reaction. Afterward, the stirring may be discontinued so that the catalyst can settle to allow the supernatant to be removed by decantation or other means.

It is important to note that the copper plating may differ from that described above when the catalyst structure is in the form of a pellet or monolith. For example, commercially available metal sponge supports in the form of pellets are frequently incompletely activated. Generally, the activation of a commercially available pellet support involves removal of a majority of the aluminum to a depth, typically, of up to about 200 μm to produce a metal sponge-type structure. However, the core of the pellet will typically still contain substantial concentrations of unactivated alloy rich in zero-valent aluminum. Thus, the aluminum in the core can react with steam and ethanol under reforming conditions, leading to the formation of cracks and resulting in a loss of mechanical integrity. Accordingly, metal sponge supports which are completely activated are preferred. An example of a completely activated material are hollow spheres of activated nickel described in U.S. Pat. No. 6,284,703.

Further, diffusion can limit plating in the interior of a fixed bed support. Thus, it is preferable to conduct the plating of a fixed bed support at room temperature or below because the ratio of the rate of diffusion to the rate of the plating reaction is more favorable at lower temperatures. The use of increased copper concentrations in the plating bath is also preferred to avoid excessive depletion of the copper concentration in the interior of the support that can occur if most of the copper is consumed by deposition onto the exterior regions of the support. An example of a preferred plating procedure for fixed bed supports is described in Example 10.

An alternative preferred embodiment for the preparation of catalysts which are mechanically robust under reforming conditions is to first deposit, typically by thermal spraying, a layer of nickel-aluminum alloy onto a substrate that is thermally and chemically stable under plating and reforming conditions. Suitable substrates may generally include steel or another metal although non-metal substrates may be used. The thickness of the layer is preferably between 5 and 500 μm and more preferably between 10 and 150 μm. The preparation of supported metal sponge films is described in U.S. Pat. No. 4,024,044, and Sillitto et al., *Mat. Res. Soc. Sym. Proc.*, vol. 549, pp. 23-29 (1999). The nickel-aluminum alloy layer provides the metal supporting structure and is preferably activated prior to copper plating.

b. Electroless Plating of Copper

Electroless plating may alternatively be used to deposit the copper-containing active phase onto the surface of the metal supporting structure. Like electrochemical displacement deposition, electroless plating comprises reducing copper ions to copper metal in a solution in contact with the supporting structure. However, unlike electrochemical displacement deposition, substantially all the copper ions are reduced by an external reducing agent rather than the supporting structure itself. As copper ion is reduced to copper metal in solution, the copper metal forms a coating on the surface of the supporting structure. The use of electroless plating to deposit copper onto the surface of a metal supporting structure is described in detail in co-assigned U.S. Pat. No. 6,376,708, which is incorporated herein by reference.

3. Integrated Copper-Containing Active Phase

In another embodiment of this invention, the catalyst does not comprise copper coated on a metal supporting structure (i.e., there is no discrete copper-containing active phase deposited on or coating the surface of the catalyst). Rather, the copper is mixed with other metals that provide desirable properties in a catalyst composition having a copper-containing active phase at the surface thereof. The catalyst composition may be substantially homogeneous. Preferably, such a catalyst is in the form of a copper-containing metal sponge (e.g., a nickel/copper sponge).

4. Optional Supplemental Metal

The catalyst may optionally contain one or more supplemental metals in addition to the copper and non-copper metals which comprise the bulk of the catalyst as described above. Suitable supplemental metals are selected from the group consisting of chromium, titanium, niobium, tantalum, zirconium, vanadium, molybdenum, manganese, tungsten, cobalt, nickel, bismuth, antimony, lead, germanium and zinc. For example, the use of supplemental metals, particularly zinc and chromium, to prolong the life of copper catalysts and preserve or enhance their activity for the water-gas shift reaction is well-known in the art and is described by Lloyd et al., *Catalyst Handbook*, pp. 309-312, ($2^{nd}$ ed., M. V. Twigg ed., Manson Publishing, London, 1996). The presence of one or more such metals tends to extend the life of the catalyst, i.e., increase the period during which the catalyst can be used in alcohol reforming before its activity decreases to unacceptable levels. Of the above elements, vanadium, chromium, molybdenum, zinc and combinations thereof are particularly preferred and are preferably present on the surface of the catalyst in the form of an oxide.

The amount of supplemental metal can vary within wide limits. Preferably, the total concentration of supplemental metals is at least about 10 parts per million parts of copper in the catalyst by weight. More preferably, the total concentration of the supplemental metals in the catalyst is from about 0.002% to about 5% by weight, more preferably from about 0.002% to about 2.5% by weight, even more preferably from about 0.005% to about 2% by weight, and still even more preferably from about 0.5% to about 1.5% by weight. Typically, the total concentration of supplemental metals does not exceed about 5% by weight. Although greater concentrations of supplemental metals can be used, no additional benefits are usually obtained by exceeding such a concentration and the activity of the catalyst is generally reduced.

One or more supplemental metals may be contained in the metal supporting structure and/or in the copper-containing active phase on the surface of the supporting structure. Where it is desirable to include the supplemental metal in an alloy-metal supporting structure, the supplemental metal is preferably incorporated into the alloy at the time the alloy is formed. Where it is desirable to include the supplemental metal in the copper-containing active phase on the surface of the supporting structure, the supplemental metal may, in some instances, be deposited simultaneously with copper. Where, however, the copper is deposited via displacement deposition or electroless plating (discussed above), the supplemental metal is preferably added to the catalyst after the copper has been deposited because the supplemental metal may dissolve under displacement deposition conditions and inhibit electroless plating. A supplemental metal may typically be added to the catalyst surface by simply contacting the catalyst with an aqueous solution containing a salt (e.g., a sulfate, nitrate, chloride, etc.) of the supplemental metal. Methods for depositing oxides of supplemental metals onto copper sponge, which are also suitable for deposition onto the surface of the metal supporting structure of this invention after the completion of the plating process can be found in Franczyk et al., U.S. Pat. No. 5,292,936, the entire disclosure of which is incorporated herein by reference.

B. Preferred Alcohol Reforming Reaction Conditions and Power Systems

The alcohol reforming process of the present invention generally comprises contacting a feed gas mixture comprising the alcohol reactant with a catalyst bed comprising the copper-containing catalyst described above in a dehydrogenation reaction zone.

The dehydrogenation reaction zone preferably comprises a continuous flow system which is configured to ensure low back-pressure and efficient heat transfer for initiating and sustaining the endothermic reaction. Reformer designs to achieve efficient heat transfer are well-known and described, for example, by Buswell et al. in U.S. Pat. No. 3,522,019 and Autenrieth et al. in U.S. Pat. Nos. 5,935,277 and 5,928,614. Each of these patents describe catalytic alcohol reforming reactors in which heat is supplied by heat exchange with a heat source through a heat-conducting wall. Preferred heat sources for heating the dehydrogenation reaction zone most often include exhaust gases from the partial oxidation of a portion of the alcohol being reformed or from a separate combustion reaction using the alcohol or another fuel source. As described below, a particularly preferred embodiment of the present invention employs exhaust gas from a combustion chamber, preferably a combustion chamber downstream of the dehydrogenation reaction zone, as the heat source for the dehydrogenation reaction zone.

The alcohol reforming reaction is strongly endothermic and efficient heat transfer to the dehydrogenation reaction zone is necessary for good conversion. Importantly, the copper-containing catalysts comprising a metal supporting structure described herein exhibit superior heat conductivity as compared to conventional reforming catalysts comprising ceramic supports. For example, as described by Gersten et al., in "The Physics and Chemistry of Materials," Wiley, New York, 2001, at pg. 144, the thermal conductivity at 300K of copper and nickel is 401 W/m·K and 91 W/m·K respectively. By comparison, the thermal conductivity at 300K of conventional reforming catalyst materials such as $\alpha$-alumina is 36 W/m·K, silica is 1.4 W/m·K and magnesia is 36 W/m·K. The copper-containing catalysts comprising a metal supporting structure in accordance with the present invention preferably exhibits a thermal conductivity at 300K of at least about 50 W/m·K, more preferably at least about 70 W/m·K and especially at least about 90 W/m·K.

The alcohol reforming reactions are generally conducted in the gas-phase at a temperature above about 100° C. However, in accordance with the present invention, it is preferred to reform the alcohol in the feed gas mixture at a temperature of less than about 400° C. More preferably, the reforming reaction is conducted at a temperature of from about 150° C. to about 400° C., more preferably at a temperature of from about 200° C. to about 375° C., and most preferably at a temperature of from about 250° C. to about 325° C. For example, it has been found that when a copper-plated, metal sponge catalyst, particularly a copper-plated metal sponge comprising either nickel or nickel doped with copper, is used in the process of the present invention, ethanol reformation may be performed with sufficiently high conversion at a temperature of from about 250° C. to about 300° C.

Since the reforming reaction is endothermic, additional heat must be supplied in order to maintain the desired temperature in the dehydrogenation reaction zone. Generally, the temperature of the reforming reaction in the catalyst bed during the alcohol reforming reaction may be controlled by any means known in the art. Preferably, the temperature of the catalyst bed is controlled to be isothermal across its length or to have a positive thermal gradient (i.e., an increasing temperature between the entrance and the exit of the bed). For example, the alcohol reactant gas may be introduced into the catalyst bed at a temperature of from about 100 to about 50° C. below the desired catalyst bed exit temperature while supplying additional heat to the dehydrogenation reaction zone necessary to maintain the desired temperature profile in the catalyst bed.

When reforming ethanol, it is important to note that operating within a narrow temperature range and avoiding excessive temperatures decreases the formation of excess methane by-product. The formation of methane (i.e., "methanation") is undesirable because the reaction consumes valuable hydrogen product at the rate of three moles of hydrogen per mole of methane produced. Excessive methanation can also be avoided by operating at low pressure. Accordingly, the pressure at the entrance to the catalyst bed is preferably less than about 30 psig, more preferably less than about 10 psig.

The dehydrogenation reaction produces a gaseous product mixture comprising hydrogen which may be introduced into a hydrogen fuel cell for the production of electric power. Accordingly, a particularly preferred embodiment of the present invention is the dehydrogenation of a primary alcohol such as methanol, ethanol or mixtures thereof to produce hydrogen for use in generating electric power in a fuel cell. For example, suitable applications for the hydrogen produced in the product mixture of the present invention include its use as a hydrogen fuel source in polymer electrolyte fuel cells, alkaline fuel cells, phosphoric acid fuel cells, molten carbonate fuel cells and solid oxide fuel cells. Use of the hydrogen as a fuel source for a polymer electrolyte fuel cell, particularly a proton exchange membrane (PEM) fuel cell, is generally most preferred. PEM fuel cells typically operate at temperatures of about 80° C. or less. Thus, the ability of the present invention for conducting alcohol reforming at a lower temperature is advantageous in that the design of the power system can be simplified and energy efficiency can be improved.

When the alcohol reforming product mixture of the present invention is to be used as a source of hydrogen for a fuel cell, it is preferred to conduct the dehydrogenation reaction in combination with a water-gas shift reaction as described above in order to minimize the amount of carbon monoxide in the product mixture. Accordingly, it is often preferred to mix the alcohol with water in the feed gas mixture fed to the dehydrogenation zone to facilitate the removal of carbon monoxide from the product stream by the water-gas shift reaction. For example, the alcohol is preferably mixed with at least one molar equivalent of water, most preferably with about 1.05 to about 1.2 molar equivalents of water, before being introduced into the dehydrogenation reaction zone.

Generally, the above-described catalysts of the present invention have some activity for the water-gas shift reaction. However, in some embodiments, it may be preferable to employ an additional water-gas shift catalyst to achieve even lower carbon monoxide concentrations in the product mixture. When an additional water-gas shift catalyst is used, the water-gas shift catalyst may be either mixed with the reforming catalyst in the reformer catalyst bed or positioned downstream of the reforming catalyst in the same or a separate catalyst bed.

For embodiments of the present invention utilizing a separate water-gas shift catalyst, it is important to note that most conventional water-gas shift reactions are typically operated at approximately 200° C., which is cooler than the typical operating temperature range of the reforming catalysts of this invention. Accordingly it may be necessary or desirable to cool the reformate product mixture before contacting the water-gas shift catalyst. Generally, any means known in the art for cooling a product gas can be used including a heat exchanger. In one embodiment, water may be introduced into the reformate gas between the reformer and the water-gas shift reactor. In such an embodiment, introducing water after the reformer would enable the amount of water in the alcohol-water feed gas mixture fed to the reformer to be reduced or eliminated.

Although not necessary or critical to the present invention, it may be desirable in certain embodiments of the present invention to employ one or more additional means for the reduction or other management of residual carbon monoxide in the reformate stream exiting the dehydrogenation reaction zone, the water-gas shift catalyst bed and/or the fuel cell. Examples of suitable means for the management or reduction of carbon monoxide are described generally, for example, by Pettersson et al., *Int'l J. Hydrogen Energy*, vol. 26, pgs 243-64 (2001), and include selectively oxidizing carbon monoxide, methanation of carbon monoxide and implementing an anode air bleed.

In a preferred embodiment where the hydrogen produced in the dehydrogenation zone is fed to a fuel cell to produce electric power, the dehydrogenation reaction is preferably conducted in a fixed bed reactor containing a packed bed of the copper-containing catalyst described above. Preferably, measures are taken to minimize back-pressure by, for example, adding an inert solid diluent to the catalyst bed to separate the catalyst particles and maintain spaces between them. The diluent is preferably a material free of acid sites which can catalyze dehydration of ethanol to ethylene and which is thermally stable under the reaction conditions. Silicon carbide and activated carbon which has not been acid-activated are examples of preferred diluents.

Alternatively, back-pressure can be minimized by using a copper-containing catalyst comprising a metal sponge supporting structure in the form of pellets, rather than powders. Examples of such shaped supporting structures include the nickel sponge pellets described in European Patent No. EP 0 648 534 A1 and U.S. Pat. No. 6,284,703, the disclosures of which are incorporated herein by reference. Nickel sponge pellets, particularly for use as fixed bed catalysts, are available commercially, for example, from W.R. Grace & Co. (Chattanooga, Tenn.) and Degussa-Huls Corp. (Ridgefield Park, N.J.). In a further alternative preferred embodiment, the catalyst may be used in the form of a monolith produced by incorporating the catalyst of the invention onto the surface of a suitable foraminous substrate (e.g., honeycomb) in order to minimize back-pressure within the reforming reactor.

With reference to FIG. 1, one embodiment of a system for generating power from the reformation of ethanol in accordance with the present invention will be described. Although the description below will disclose with particularity the use of the above-described copper-containing catalyst to effect the dehydrogenation of ethanol, it should be recognized that the principles are generally applicable for dehydrogenating other primary alcohols including methanol or a mixture of ethanol and methanol.

An alcohol/water feed comprising a mixture of ethanol and water is introduced into the dehydrogenation reaction zone comprising a packed bed 101 of the copper-containing dehydrogenation catalyst comprising a metal supporting structure. The feed comprising the ethanol/water mixture is preferably introduced into the dehydrogenation reaction zone as a gaseous feed mixture, for example, after having been vaporized in an evaporator (not shown) as is generally known in the art of alcohol reforming. The catalyst bed 101 is heated with a heat jacket 102 to maintain the desired temperature in the dehydrogenation zone. Reforming of the ethanol/water mixture within the catalyst bed 101 produces a product mixture comprising hydrogen, carbon monoxide, carbon dioxide, water, and methane. The product mixture is then passed through an additional catalyst bed 103 containing a suitable water-gas shift catalyst to selectively oxidize carbon monoxide to carbon dioxide. Compact water-gas shift modules have been developed and are commercially available, for example, from Hydrogen Source (South Windsor, Conn.). The product mixture exiting catalyst bed 103 is then cooled to a suitable temperature (generally 80° C. or below) and introduced into a hydrogen fuel cell 105 (e.g., a proton exchange membrane fuel cell) along with an oxygen source (e.g., air) to generate electric power. Electric power is generated by the reaction of hydrogen with oxygen in the fuel cell to produce water. It should be understood that the fuel cell may comprise a plurality of fuel cells (i.e., a "stack" of fuel cells) as is conventional in fuel cell applications.

The fuel cell effluent, which comprises water vapor, methane, and carbon dioxide is then combusted with air in a combustion chamber 107 supplied with a source of oxygen (e.g., air). Suitable combustion chambers may include a gas turbine, a heat engine, an internal combustion engine, or other device to drive a generator 109 which produces additional electric power. The hot combustion effluent from generator 109 may be recycled to heat jacket 102 as a heat source for heating the reformer catalyst bed 101 in the dehydrogenation zone.

Combustion of the fuel cell effluent also provides a convenient means to treat emissions from the power system. Undesirable components of the fuel cell effluent, such as acetaldehyde, carbon monoxide, residual alcohol and/or methane will be largely converted to carbon dioxide by combustion in the combustion chamber 107. Residual hydrogen will be oxidized to water. It has recently been reported that fugitive hydrogen emissions may represent a threat to the ozone layer. (See Tromp et al., Science, 300, 1740-2, (2003)). In addition, the exhaust from the internal combustion engine (unlike the exhaust of conventional PEM fuel cell power systems) is sufficiently hot to allow catalytic converters to function effectively, allowing for further reductions in harmful emissions.

Preferably, in vehicular power applications, the fuel cell effluent, predominantly carbon dioxide and methane with traces of hydrogen, water vapor and carbon monoxide, is introduced into a combustion system which can provide either electric and/or mechanical power. In such applications, the combustion system may include an internal combustion engine to produce torque to drive the vehicle or an internal combustion engine in combination with a generator to produce additional electric power.

In a particularly preferred embodiment, the power system includes a flexible fuel internal combustion engine capable of combusting alcohols, methane or a mixture thereof is used to combust the fuel cell effluent and provide a source of mechanical power to drive the vehicle. One or more electric motors supplied with the direct current produced by the fuel cell provide additional power, a configuration similar to that used for hybrid vehicles. Such a preferred power system is shown in FIG. 2 using ethanol as a fuel.

Figure 2:
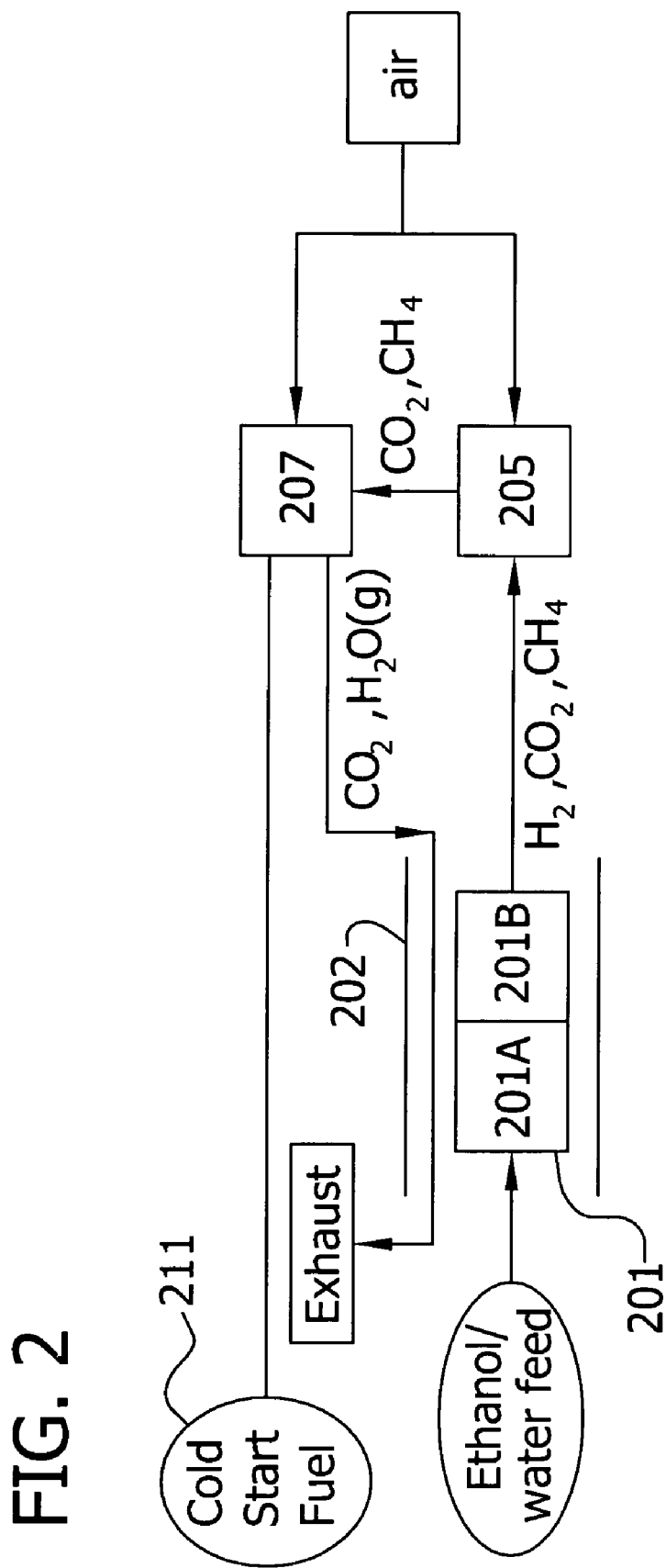
FIG. 2 is a schematic of a power system in accordance with another embodiment of the present invention wherein the hydrogen-containing product mixture produced in reforming the alcohol is introduced as a fuel source to a hydrogen fuel cell to generate electric power and wherein effluent from the hydrogen fuel cell is passed to an internal combustion engine which is also supplied by a separate alcohol feed.

Referring now to FIG. 2, a water-ethanol feed mixture with a slight molar excess of water is introduced into a dehydrogenation reaction zone comprising a packed bed 201 containing a copper-plated nickel sponge reforming catalyst 201A and a water gas shift catalyst 201B and heated by a heat jacket 202. The alcohol is reformed to produce a reformate comprising hydrogen, carbon dioxide and methane in the packed bed as previously described. The reformate effluent from the dehydrogenation zone is fed to a hydrogen fuel cell 205 at a suitable temperature along with an oxygen source (e.g., air) to generate direct current electrical power. Methane and carbon dioxide do not degrade the performance of PEM fuel cells. The effluent from fuel cell 205, primarily methane and carbon dioxide, is combusted with a source of oxygen (e.g., air) in an internal combustion engine 207. The hot exhaust from the internal combustion engine is then used as a heat source for heat jacket 202 before leaving the system as exhaust, preferably through a catalytic converter (not shown). In this way, the waste heat from the internal combustion engine is put to use supplying the heat required for the endothermic ethanol reforming reaction. Reformer designs that enable heat exchange between a separate hot gas stream and the reforming catalyst bed are well-known in the art.

Because of the endothermic nature of the alcohol reforming reaction, a significant drawback to the operation of a fuel cell in vehicular transportation applications occurs at start-up. In particular, fuel cells do not allow for the "cold start" of a vehicle (i.e., there is a time delay at start-up until the reformer and fuel cell reach their design operating temperature before sufficient power is generated to drive the vehicle). Thus, in a particularly preferred embodiment of the present invention, the internal combustion engine 207 of the combustion-driven power subsystem described above with respect to FIG. 2 is a flexible fuel internal combustion engine that may be operated using an alcohol feed or another cold start fuel source 211 separate from the fuel cell effluent. The alcohol feed to the internal combustion engine is preferably anhydrous and therefore separate from the ethanol-water feed to the reforming reactor. At start-up, the internal combustion engine is operated using alcohol from the separate cold start fuel source 211 as a fuel to provide cold start performance similar to vehicles powered by conventional internal combustion engines. During normal operation, after the reformer and fuel cell have reached their design operating temperature, the vehicle may be primarily powered by an electric motor supplied with the direct current generated by the hydrogen fuel cell. The internal combustion engine continues to function to offset some portion of the baseline power required by the vehicle, but the internal combustion engine is primarily fueled by methane from the fuel cell effluent rather than alcohol from the separate cold start fuel source 211. If driving conditions require additional transient power, the vehicle may then draw upon the internal combustion engine for additional torque. Further, methane in the fuel cell effluent to the internal combustion engine may be supplemented by additional alcohol feed from the separate cold start fuel source 211 to generate such additional torque. Additional supplemental power may also be supplied by a battery.

In addition to providing better cold start and transient power performance, this preferred configuration allows a power system to be constructed at a substantially lower cost. Hydrogen fuel cells are generally the most costly components of fuel cell based power systems for vehicles. The power system herein described requires substantially less fuel cell capacity than conventional designs, because peak power is supplemented by the internal combustion engine. The design only requires sufficient fuel cell capacity to provide a portion of the baseline power, the other portion being provided by the internal combustion engine operating on alcohol and/or methane.

EXAMPLES

The following examples are simply intended to further illustrate and explain the present invention. The invention, therefore, should not be limited to any of the details in these examples.

Further working examples for the preparation of copper-plated metal catalysts are described in co-assigned U.S. Pat. No. 6,376,708 and co-assigned and co-pending U.S. patent application Ser. No. 09/832,541, published as US-2002-0019564-A1. The entire texts of U.S. Pat. No. 6,376,708 and U.S. Publication No. US-2002-0019564-A1are hereby incorporated herein by reference.

Example 1

Preparation of a Copper-Plated Nickel Sponge Catalyst

This example demonstrates the preparation of a copper-plated nickel sponge catalyst using displacement deposition.

A nickel sponge supporting structure (68.7 g, RANEY 4200 from W.R. Grace, Chattanooga, Tenn.) was suspended in nitrogen sparged water (400 ml) in a glass beaker. A solution of 12% $NaBH_4$ (50 g) in 14M NaOH was added with stirring. Vigorous foaming was observed for 1 minute. After 10 minutes of stirring, the catalyst was allowed to settle and the supernatant decanted. An additional portion of nitrogen-sparged water (400 ml) was added and stirred briefly. The catalyst was again allowed to settle before the rinse was decanted.

A third portion of nitrogen-sparged water (250 ml) was added to the catalyst. Glacial acetic acid (about 8 ml) was added to reduce the pH to 5. The catalyst suspension was then contacted with a nitrogen-sparged solution of $CuSO_4.5H_2O$ (54.0 g, 20% by weight copper with respect to the catalyst) and tetrasodium EDTA dihydrate (108.0 g) in water (300 ml). NaOH (2.5 N, 73.0 ml) was added over 103 minutes with continuous stirring and nitrogen sparging. The pH of the suspension rose from 6.8 to 11.3. The catalyst was allowed to settle, the beaker was wrapped with heating tape, and the blue supernatant was decanted.

$CuSO_4.5H_2O$ (67.5 g, 25 weight % copper with respect to the catalyst) was dissolved in nitrogen-sparged water (200 ml) to form a copper solution. A catalyst suspension was formed by adding a hot (74° C.) mixture of 50% gluconic acid (159.0 g), 2.5N NaOH (54 ml), and nitrogen-sparged water (250 ml) to the catalyst. The copper solution was then added to the catalyst suspension with stirring over 95 minutes while heat was applied to the beaker with the heating tape (final temperature 72° C.). The pH fell from 3.8 to 3.1. The catalyst was allowed to settle and the green supernatant was decanted.

The catalyst was rinsed with nitrogen-sparged water (700 ml). The rinse was decanted and 75.6 g. of a dull copper colored catalyst was recovered and stored under water. The composition of the catalyst was 66.1% Ni, 30.4% Cu and 3.5% Al.

The catalyst was found to consist of two fractions when a small sample (approx. 1 g) of the catalyst was suspended in water. The fractions consisted of a copper-colored lower layer and a gray upper layer. The BET surface area and surface nickel concentration were determined after hydrogen drying at 130° C. by the method described in Schmidt, "Surfaces of Raney® Catalysts," *Catalysis of Organic Reactions*, pp. 45-60 (M. G. Scaros and M. L. Prunier, eds., Dekker, New York, 1995). Results of the analysis are shown in Table 1. Data for the RANEY 4200 substrate are shown for comparison.

TABLE 1

| Sample | BET surface area | Surface Nickel |
|---|---|---|
| RANEY 4200 | 70 m²/g | 700-800 μmole/g |
| Upper Fraction | 36.8 m²/g | 54.8 μmole/g |
| Lower Fraction | 40.1 m²/g | 32.1 μmole/g |

Example 2

Reforming of Ethanol Using a Copper-Plated Nickel Sponge Catalyst

This example demonstrates the use of a copper-plated nickel sponge catalyst for the reforming of ethanol.

The experiment was conducted in a stainless steel reactor comprising a stainless steel 304 tube (457.2 mm length, 12.7 mm internal diameter) wrapped with a coiled cable heater. A tube for preheating the ethanol feed was connected to the top of the reactor. The catalyst mass was disposed on a glass wool plug placed on a hollow insert at the bottom of the tube reactor. A thermocouple was positioned at the bottom of the catalyst bed and used to monitor and control the reaction temperature using the coiled cable heater. Effluents were analyzed by gas chromatography using a thermal conductivity detector. The reactor exit was at atmospheric pressure.

The reactor was charged as follows. After inserting a fresh glass wool plug, an aqueous slurry of 325 mesh silicon carbon (1.0 g) (available from Alfa Aesar, Ward Hill, Mass.) was run through the reactor to form the base of the catalyst bed on top of the glass wool. A slurry of silicon carbide (1.5 g) and the catalyst of Example 1 (2.02 g) was then run through the reactor. No breakthrough was observed indicating that the full catalyst charge remained in the reactor. The catalyst was dried in the reactor overnight at 120° C. under nitrogen before use.

Table 2 gives the results of ethanol reforming using various temperatures, flow rates, and concentrations of water in the feed. The catalyst was on-stream for ethanol reforming for a total of approximately 30 hours before the data in Table 2 was acquired. Note that methane yields and mass balances based on methane can exceed 100% due to analytical uncertainties and the methanation of CO as illustrated in Equation 6:

$$CO + 3H_2 \rightarrow CH_4 + H_2O \qquad (6)$$

Also note that hydrogen yield is omitted from Table 2 and the following examples. Although hydrogen was measured directly in the gas chromatograph, thermal conductivity detectors exhibit low sensitivity for hydrogen compared to carbon-containing molecules resulting in more scatter in the data. Accordingly, hydrogen yield can be calculated more accurately from the yield of carbon-containing compounds such as carbon monoxide, carbon dioxide, and methane.

TABLE 2

Ethanol reforming product distribution at various conditions reported as molar yields relative to amount of ethanol fed.

| $H_2O$ in feed[1] (wt. %) | Temp (° C.) | Feed (ml/min) | $CH_3CH_2OH$ % | $CH_3C(O)H$ % | $CH_4$ % | $CO_2$ % |
|---|---|---|---|---|---|---|
| 50% | 250 | 0.15 | trace | 4.3 | 95.1 | 6.5 |
|  |  | 0.30 | 21.7 | 26.7 | 52.2 | 4.5 |
|  |  | 0.40 | 42.3 | 29.6 | 25.7 | 1.5 |
|  |  | 0.80 | 62.8 | 27.9 | 9.2 | 0.2 |
|  |  | 1.20 | 74.7 | 20.9 | 4.5 | trace |
| 50% | 280 | 0.20 | 0 | 0 | 101.0 | 24.5 |
|  |  | 0.40 | 14.2 | 19.6 | 66.8 | 6.0 |
|  |  | 0.80 | 50.4 | 26.2 | 22.9 | 2.1 |
|  |  |  | 64.2 | 21.9 | 14.0 | 1.1 |
| 30% | 250 | 0.30 | 44.2 | 14.8 | 40.8 | 1.5 |
|  | 280 | 0.30 | 12.9 | 9.6 | 76.9 | 3.7 |
|  | 300 | 0.30 | 0 | 2.9 | 97.5 | 6.7 |
|  | 300 | 0.20 | 0 | 0 | 102.0 | 15.1 |
|  | 320 | 0.20 | 0 | 0 | 104.6 | 42.0 |
| 10% | 250 | 0.20 | 22.2 | 8.3 | 69.5 | 1.3 |
|  | 250 | 0.30 | 47.1 | 12.1 | 40.8 | 0.5 |
|  | 280 | 0.20 | 6.2 | 3.9 | 90.5 | 2.1 |
| 0% | 250 | 0.20 | 0 | 0 | 104.4 | 3.5 |
|  |  | 0.25 | 9.9 | 3.9 | 87.5 | 0.8 |
|  |  | 0.40 | 33.3 | 9.0 | 58.3 | 0.3 |
|  |  | 0.60 | 50.9 | 11.1 | 38.3 | 0.1 |
|  |  | 0.90 | 78.3 | 9.0 | 11.8 | trace |

[1]Remainder of the feed comprised ethanol.

Example 3

Reforming of Methanol Using a Copper-Plated Nickel Sponge Catalyst

This example demonstrates the reforming of methanol using a copper-plated nickel sponge catalyst.

The experiment was conducted in accordance with Example 2 above except that a feed consisting of 70% methanol by weight and 30% water was used. The results are shown in Table 3 below.

TABLE 3

Methanol Reforming Product Distribution from reforming 70% methanol feed

| Temp | Feed flow (ml/min) | Methanol | Methane | CO | $CO_2$ |
|---|---|---|---|---|---|
| 300° C. | 0.40 | 13.3% | 3.2% | 81.2% | 2.3% |
| 300° C. | 0.20 | 2.4% | 3.7% | 86.9% | 7.0% |
| 320° C. | 0.20 | 1.7% | 5.5% | 75.5% | 17.9% |

Example 4

Reforming of Ethanol Over an Extended Operation Period

This example demonstrates the ability of the catalyst of the present invention to sustain high conversions for an extended period of time in the reforming of ethanol.

The experiment was conducted under substantially similar conditions as in Example 2 above except that the reactor was charged by depositing silicon carbide (1.0 g) initially, followed by a slurry comprising the catalyst of Example 1 (2.50 g) and silicon carbide (5.0 g). Temperature was monitored by a thermocouple inserted down the bore of the reactor to a position approximately 10.2 cm above the bottom of the catalyst bed.

The reactor was operated such that the temperature of the product mixture exiting the catalyst bed was maintained at 280° C. The temperature of the upper thermocouple remained relatively constant at about 430° C. An ethanol/water feed mixture (70:30 ethanol/water on a weight basis) was introduced to the dehydrogenation zone at a rate of 0.3 ml/min with 100 sccm of nitrogen. The reactor was operated for 44 hours over which time the pressure in the reactor rose from 28 psig to 80 psig. No ethanol or acetaldehyde was detected in the product mixture during this period and conversion to methane was 100% within analytical uncertainty. Table 4 below shows the selectivity to CO and $CO_2$ during the experiment.

TABLE 4

Yield of ethanol reforming products using a 70% ethanol feed at 280° C.

| Time (hrs) | CO % | $CO_2$ % |
|---|---|---|
| 2 | 34 | 66 |
| 5 | 60 | 40 |
| 12 | 81 | 19 |
| 20 | 85 | 15 |
| 25 | 85 | 15 |
| 31 | 88 | 12 |
| 35 | 88 | 12 |
| 40 | 88 | 12 |
| 44 | 87 | 13 |

Example 5

Reforming of Ethanol in a Packed Bed Having a Thermal Gradient

This example demonstrates that high conversion and low methanation is achievable by reforming ethanol with a copper-plated, nickel sponge catalyst in a packed bed operated at low pressure, an exit temperature of 300° C. or less, and a thermal gradient wherein the inlet temperature is below the exit temperature.

A vertically-mounted, stainless steel tubular reactor (457.2 mm length, 12.7 mm internal diameter) wrapped with a coiled cable heater similar to that in Example 2 was used except that the ethanol feed stream was introduced at the bottom of the reactor and the catalyst bed was placed at the top of the reactor between two glass wool plugs. Thermocouples were placed upstream and downstream of the catalyst bed. The catalyst prepared in Example 1 (2.50 g) was used. A mixture of 70% ethanol/30% water on a weight basis was fed to the reactor at a rate of 0.1 ml/min. and the reactor was heated at a controlled rate to maintain the exit temperature of the catalyst bed effluent at 275° C. The temperature upstream of the catalyst bed was steady at 245° C. for the duration of the experiment. Pressure upstream of the reactor did not exceed 5 psig.

Table 5 shows the high conversions achieved over more than 200 hours of continuous operation. After 286 hours online, the exit temperature was raised to 300° C. Data taken at this temperature is shown in Table 6. No acetaldehyde or ethanol was detected in the product mixture. Increasing the temperature to 300° C. also increased conversion to 100%. No detectable methanation was found throughout the experiment.

TABLE 5

Product yields for Example 5 at 275° C.

| Time (hrs) | CO % | $CO_2$ % | $CH_4$ % | $CH_3C(O)H$ % | Ethanol % |
|---|---|---|---|---|---|
| 10 | 96.1 | 2.0 | 101.9 | ND | ND |
| 20 | 97.1 | 1.8 | 101.1 | ND | ND |
| 40 | 96.3 | 2.5 | 101.2 | ND | ND |
| 60 | 96.5 | 2.5 | 101.0 | ND | ND |
| 80 | 96.3 | 2.7 | 101.0 | ND | ND |
| 100 | 95.4 | 3.4 | 101.1 | ND | ND |
| 120 | 96.5 | 2.6 | 100.9 | ND | ND |
| 140 | 96.6 | 2.4 | 100.8 | 0.05 | ND |
| 160 | 96.8 | 2.2 | 100.9 | ND | ND |
| 180 | 97.1 | 2.1 | 100.8 | ND | ND |
| 201 | 96.6 | 2.2 | 101.1 | ND | ND |
| 220 | 95.8 | 2.2 | 100.8 | 0.57 | ND |
| 265 | 96.1 | 2.4 | 99.5 | 0.71 | 0.31% |
| 285 | 95.3 | 2.1 | 99.3 | 1.03 | 0.62% |

ND = Not detected

TABLE 6

Product yields for Example 5 after increasing the exit temperature to 300° C.

| Time (hrs) | CO % | $CO_2$ % | $CH_4$ % | $CH_3C(O)H$ % | Ethanol % |
|---|---|---|---|---|---|
| 290 | 91.4 | 8.2 | 100.4 | ND | ND |
| 295 | 91.2 | 8.2 | 100.6 | ND | ND |
| 300 | 91.9 | 7.7 | 100.3 | ND | ND |
| 306 | 91.5 | 8.2 | 100.3 | ND | ND |
| 310 | 91.5 | 7.9 | 100.5 | ND | ND |

Example 6

Preparation of a Copper-Plated, Nickel Sponge Catalyst

This example illustrates a plating method for metal sponge substrates which provides similar conversion and superior carbon dioxide levels and which requires less copper sulfate than the methods of Morgenstern, et. al. (U.S. Pat. No. 6,376,708) or of Example 1. The experiment also used a high solids concentration, thereby minimizing waste volume. In this Example, the substrate and catalyst mass were determined by the water displacement method assuming a density factor of 1.16.

A nickel sponge supporting structure (48.3 g, RANEY 4200 from Grace Davison, Chattanooga, Tenn.) was transferred to a 1 L beaker with nitrogen-sparged water and the excess water decanted off. A nitrogen-sparged solution of $CuSO_4.5H_2O$ (47.45 g) and $Na_4EDTA.2H_2O$ (94.92 g) in water (400 ml) was added to the catalyst and the slurry was stirred while 2.5N NaOH (91 ml) was added over 48 minutes. The pH rose from 8.4 to 11.4. The blue supernatant was decanted and the beaker was wrapped with heating tape.

A hot mixture of 50% gluconic acid (11 g) and water (400 ml) was added to the catalyst. Heat was applied and a mixture of concentrated sulfuric acid (5.70 g) and water (50 ml) was added over 43 minutes. The temperature was steady between 59° C. and 60° C. and the pH fell from 5.2 to 2.2. The mixture was stirred for a further 45 minutes. The final pH was 2.8.

The blue supernatant was decanted, nitrogen-sparged water (500 ml) was added and the pH adjusted to 7 with sodium hydroxide. This step helps to remove residual nickel and EDTA. The catalyst was allowed to settle and the supernatant removed by decantation. 51.3 g of catalyst was recovered having a composition of 76.8% Ni, 19.9% Cu, 3.2% Al and 0.2% Fe.

Example 7

Reforming of Ethanol Using a Copper-Plated, Nickel Sponge Catalyst

This example demonstrates the reforming of ethanol in the presence of a catalyst comprising copper at the surface of a nickel sponge supporting structure.

A catalyst as prepared in Example 6 (2.50 g) was placed in a reactor having a configuration identical to that described in Example 2 above. An alcohol feed comprising 70% ethanol and 30% water by weight was introduced to the reactor at a rate of 0.1 ml/min. The exit temperature was increased gradually to 300° C. over the first 24 hours of the experiment. Note that the conversion is slightly lower than in Example 5, but that conversion of CO to $CO_2$ (the water-gas shift reaction) proceeds to a significantly greater extent. Methanation is also higher, but, as seen in the next example, diminishes with time.

TABLE 7

| Example 7 Effluent Composition | | | | | |
|---|---|---|---|---|---|
| Time (hrs) | Outlet Temp. | CO % | $CO_2$ % | $CH_4$ % | $CH_3C(O)H$ % | Ethanol % |
| 7 | 270° C. | 81.7 | 14.3 | 103.5 | 0.2 | ND |
| 15 | 270° C. | 80.7 | 15.2 | 101.8 | 0.6 | 0.5% |
| 20 | 270° C. | 68.5 | 26.8 | 104.0 | 0.3 | ND |
| 31 | 300° C. | 44.1 | 49.8 | 106.1 | ND | ND |
| 35 | 300° C. | 47.2 | 46.9 | 105.9 | ND | ND |
| 40 | 300° C. | 43.7 | 51.0 | 105.1 | ND | ND |
| 45 | 300° C. | 47.2 | 48.6 | 104.2 | ND | ND |

Example 8

Reforming of Ethanol Over an Extended Operation Period

This example demonstrates the isothermal reforming of ethanol over an extended period of time. The example further illustrates a gradual decline in methanation using the catalyst of Example 6 while maintaining high $CO_2$ conversion.

As in Example 7 above, a reactor apparatus identical to that describe in Example 2 was loaded with catalyst as prepared in Example 6 (2.50 g) and operated at a flow rate of 0.1 ml/min. using feed comprising 70% ethanol/30% water by weight. The exit temperature of the catalyst bed was maintained at 300° C. No acetaldehyde or ethanol was detected in the product mixture during the run. Methanation declined steadily over the course of the experiment, as shown in Table 8.

TABLE 8

| Example 8 Effluent Composition | | | |
|---|---|---|---|
| Time (hrs) | CO % | $CO_2$ % | $CH_4$ % |
| 10 | 57.6 | 37.5 | 104.8 |
| 20 | 64.0 | 31.9 | 104.1 |
| 32 | 64.1 | 32.5 | 103.3 |
| 41 | 66.4 | 30.8 | 102.8 |
| 50 | 70.9 | 27.1 | 102.0 |
| 61 | 76.9 | 21.8 | 101.3 |
| 70 | 77.8 | 20.8 | 101.3 |
| 85 | 60.3 | 37.2 | 102.5 |
| 91 | 69.6 | 28.9 | 101.5 |
| 100 | 68.6 | 30.5 | 100.9 |
| 110 | 77.9 | 21.8 | 100.3 |

Example 9

Reforming of Methanol Using Copper-Plated, Nickel Sponge Catalysts

This example demonstrates the activity and stability of the catalyst of this invention for the reforming of methanol under mild, near-isothermal conditions.

Catalyst prepared in Example 1 (2.52 g) was mixed with a polymer bead diluent (1.0 g of Tenax TA, 80-100 mesh from Alltech Associates, Deerfield, Ill.) and loaded into a reactor as described in Example 2, which was oriented horizontally for this experiment. The reactor was fed with 0.1 ml/min. of a 60% methanol/40% water mixture (0.1 ml/min, 1.19:1 molar ratio of water:methanol) and the exit temperature was maintained at 320° C. The pressure remained below 5 psig throughout the run. Temperature upstream of the catalyst bed was approximately 335° C. and varied from 309° C. to 369° C. during the experiment.

Table 9 shows the results. Higher temperatures are required to obtain conversions of methanol above 90% than are required for ethanol. Methane yields are generally about 1%, similar to the value for ethanol.

TABLE 9

Example 9 reactor effluent

| Time (hrs) | CO % | $CO_2$ % | $CH_4$ % | Methanol % |
|---|---|---|---|---|
| 10 | 70.5 | 25.6 | 2.9 | 1.0 |
| 20 | 79.5 | 17.1 | 1.8 | 1.6 |
| 30 | 83.4 | 13.3 | 1.8 | 1.5 |
| 40 | 84.7 | 11.5 | 1.7 | 2.2 |
| 50 | 85.5 | 9.7 | 1.4 | 3.3 |
| 60 | 84.1 | 5.8 | 0.4 | 9.7 |
| 70 | 83.1 | 4.7 | 0.5 | 11.8 |
| 80 | 84.7 | 6.4 | 0.6 | 8.3 |
| 90 | 83.3 | 5.0 | 0.6 | 11.1 |
| 100 | 80.3 | 9.1 | 1.0 | 9.6 |
| 110 | 79.5 | 8.1 | 0.9 | 11.5 |

Example 10

Preparation of a Copper-Plated, Nickel Sponge Catalyst for Fixed Bed Operations

This example describes the preparation of a fixed bed catalyst by plating copper onto nickel sponge fixed bed supporting structure.

A nickel sponge supporting structure disposed on a pellet substrate (45 pellets comprising 6.79 g of Metalyst® alpha-1401-X018 commercially available from Degussa AG, Hanau, Germany) was dried overnight under vacuum at 120° C. with a nitrogen purge. The pellets were loaded into a length of plastic tubing (9.525 mm inner diameter) between glass wool plugs under a nitrogen atmosphere and a plating bath solution containing $CuSO_4 5H_2O$ (10.67 g) and $Na_4EDTA.2H_2O$ (21.34 g) in water (300 ml) was circulated over the catalyst at room temperature while a mixture of 2.5N NaOH (26 ml) and water (50 ml) was added dropwise over 124 minutes. During plating, the plating bath solution was held in a stirred reservoir under a nitrogen atmosphere and circulated between the catalyst and the reservoir using a peristaltic pump. The pH rose from 10.0 to 12.0. The catalyst was then rinsed with water.

A mixture of $CuSO_4 5H_2O$ (6.67 g), gluconic acid (5.2 g), 2.5N NaOH (2.7 g) and water (300 ml) was then added to the reservoir and circulated over the catalyst for two hours at room temperature. The catalyst was rinsed with water and then dried overnight at 120° C. under vacuum with nitrogen purge. 6.65 g (98%) of catalyst was recovered.

Example 11

Reforming of Ethanol Under Isothermal Conditions

This example demonstrates catalyst performance for reforming ethanol under nearly isothermal conditions (as compared to ethanol reforming having a temperature gradient across the reactor as described in Example 7).

The experiment comprised reforming ethanol using the catalyst prepared in Example 6 with the catalyst bed maintained nearly isothermal at a temperature of 280° C. In order to eliminate the temperature gradient, a modified reactor was used. The feed gas mixture (70% ethanol/30% water by weight) was pumped at 0.10 ml/min through a stainless steel tube (1.58 mm outer diameter) into a pre-heater consisting of a vertical stainless steel tube (457.2 mm length, 9.525 mm inner diameter, 12.7 mm outer diameter) packed with stainless steel balls (3 mm diameter and 4 mm diameter) and wrapped with a cable heater. The feed tube was wrapped in a spiral manner over the cable heater and then coupled to the pre-heater at the bottom.

The top of the pre-heater (the outlet) was coupled to a stainless steel tube (177.8 mm length, 9.525 mm inner diameter, 12.7 mm outer diameter) containing the catalyst prepared in Example 6 (2.49 g) packed between two deactivated glass wool plugs. The upper (reactor) tube was wrapped with a separate cable heater. A thermocouple located at the junction between the pre-heater and the reactor tubes was used to control the pre-heater and maintain constant temperature upstream of the catalyst bed while a thermocouple positioned just above (downstream of) the catalyst bed controlled the cable heater and maintained the downstream (exit) temperature of the catalyst bed at 280° C. Both temperatures stabilized within two hours and remained constant to within 1° C. The entire assembly was insulated, and the downstream system for gas chromatographic analysis was the same as that described in Example 2.

Table 10 demonstrates the high conversion and stability achieved by operation under nearly isothermal conditions. Pressure upstream of the pre-heater remained below 15 psi throughout the experiment. Note that under isothermal conditions, excess methane formation decayed to a steady state value of about 2% with eight hours. Traces of ethanol were seen but were below the quantitation limit. Acetaldehyde reached quantifiable levels only at the end of the run. Both were less than 1% throughout the experiment.

TABLE 10

Product yields for Example 11 reforming at 280° C. under isothermal conditions

| Time (hrs) | $H_2$ | CO | $CH_4$ | $CO_2$ | Acetaldehyde |
|---|---|---|---|---|---|
| 0.6 | 149.6% | 10.3% | 111.7% | 78.0% | 0.0% |
| 1.2 | 103.9% | 81.6% | 103.7% | 14.7% | 0.0% |
| 2.0 | 97.2% | 90.2% | 102.4% | 7.4% | 0.0% |
| 4.0 | 94.9% | 90.1% | 103.0% | 6.9% | 0.0% |
| 5.9 | 96.8% | 90.3% | 102.8% | 6.9% | 0.0% |
| 8.2 | 96.3% | 91.4% | 102.0% | 6.6% | 0.0% |
| 10.3 | 95.2% | 92.9% | 101.9% | 5.2% | 0.0% |
| 15.3 | 97.3% | 91.3% | 102.0% | 6.7% | 0.0% |
| 19.8 | 98.7% | 90.7% | 101.8% | 7.5% | 0.0% |
| 25.8 | 99.6% | 91.6% | 101.5% | 6.8% | 0.0% |
| 30.3 | 96.9% | 92.5% | 101.7% | 5.8% | 0.0% |
| 40.8 | 98.9% | 91.3% | 101.5% | 7.2% | 0.0% |
| 60.3 | 99.0% | 92.2% | 101.5% | 6.3% | 0.0% |
| 79.5 | 101.5% | 86.4% | 101.9% | 11.6% | 0.0% |
| 100.5 | 99.5% | 90.6% | 101.4% | 8.0% | 0.0% |
| 120.1 | 104.6% | 88.9% | 101.0% | 10.0% | 0.0% |
| 141.1 | 97.7% | 94.1% | 101.3% | 4.5% | 0.0% |
| 149.1 | 97.5% | 95.4% | 100.5% | 2.9% | 0.6% |

Example 12

Reforming of Ethanol Over a Copper-Plated Nickel Sponge Fixed Bed Catalyst

This example demonstrates the performance of a copper-plated fixed bed catalyst in reforming ethanol.

The experiment comprised reforming ethanol using the catalyst prepared in Example 10 (1.46 g, 10 pellets) under isothermal conditions at 300° C. in the same apparatus described in Example 11. The feed gas mixture contained 70% ethanol and 30% water by weight and was introduced at a flow rate of 0.06 ml/min to provide an equivalent flow rate to catalyst ratio as provided in the previous examples which using 2.50 g of catalyst and 0.10 ml/min of feed gas mixture.

As illustrated by the data in Table 12 below, the fixed bed material achieves high (>85%) conversion at 300° C. The fixed bed catalyst also differs from the powder catalysts in that the decline in methanation occurs more slowly and continuously, requiring about 20 hours at 300° C.

TABLE 12

Results of Example 12

| Time (hrs) | $H_2$ | CO | $CH_4$ | $CO_2$ | Acetaldehyde | Ethanol |
|---|---|---|---|---|---|---|
| 0.9 | 27.0% | 0.7% | 147.3% | 52.0% | 0.0% | 0.0% |
| 1.8 | 43.6% | 1.1% | 140.4% | 58.5% | 0.0% | 0.0% |
| 3.8 | 53.0% | 7.5% | 134.6% | 58.0% | 0.0% | 0.0% |
| 6.1 | 66.9% | 27.0% | 124.5% | 48.5% | 0.0% | 0.0% |
| 8.1 | 78.2% | 49.6% | 116.4% | 34.0% | 0.0% | 0.0% |
| 10.1 | 85.4% | 61.3% | 111.9% | 26.6% | 0.1% | 0.0% |
| 14.8 | 92.6% | 74.6% | 105.8% | 17.7% | 1.0% | 0.0% |
| 20.2 | 96.4% | 79.2% | 98.4% | 12.6% | 2.4% | 2.5% |
| 30.2 | 98.6% | 78.0% | 89.3% | 10.0% | 4.7% | 6.6% |
| 40.3 | 98.4% | 78.5% | 85.1% | 7.8% | 5.1% | 9.2% |
| 60.7 | 107.0% | 86.0% | 92.7% | 9.4% | 2.6% | 3.3% |
| 80.2 | 102.4% | 76.3% | 76.9% | 6.3% | 6.5% | 13.8% |
| 99.8 | 99.9% | 70.6% | 70.5% | 5.8% | 7.9% | 18.7% |
| 120.0 | 95.5% | 67.0% | 67.4% | 5.9% | 8.1% | 21.7% |

Example 13

Reforming of Ethanol at Various Temperatures Over a Fixed Bed Catalyst

This example describes the use of a fixed bed catalyst for reforming ethanol at various temperature.

The experiment was a continuation of that described in Example 12 above while varying flow rate and temperature. Isothermal conditions were maintained. Table 13 summarizes the performance of the catalyst at 300° C. and 320° C. at several flow rates.

TABLE 13

Ethanol reforming as described in Example 12 with temperature and flow rate variations

| Temp (° C.) | Flow rate (ml/min) | $H_2$ | CO | $CH_4$ | $CO_2$ | $CH_3C(O)H$ | $CH_3CH_2OH$ |
|---|---|---|---|---|---|---|---|
| 300 | 0.01 | 100.5% | 64.1% | 106.1% | 29.5% | 0.2% | 0.0% |
| 300 | 0.02 | 118.9% | 83.4% | 90.9% | 16.9% | 1.7% | 2.7% |
| 300 | 0.03 | 111.3% | 82.1% | 86.0% | 11.5% | 3.3% | 6.9% |
| 320 | 0.02 | 104.0% | 64.8% | 105.5% | 29.7% | 0.0% | 0.0% |
| 320 | 0.03 | 109.3% | 78.2% | 100.3% | 20.7% | 0.2% | 0.2% |
| 320 | 0.045 | 118.2% | 87.9% | 93.5% | 15.3% | 0.7% | 1.0% |
| 320 | 0.06 | 126.1% | 92.2% | 89.1% | 13.3% | 1.4% | 1.3% |

At the conclusion of the experiment, it was discovered that much of the catalyst was reduced to powder. Such loss of structural integrity is attributed to unactivated aluminum in the core of the substrate which reacts with water vapor to form alumina under reaction conditions.

The present invention is not limited to the above embodiments and can be variously modified. The above description of preferred embodiments is intended only to acquaint others skilled in the art with the invention, its principles and its practical application so that others skilled in the art may adapt and apply the invention in its numerous forms, as may be best suited to the requirements of a particular use.

With reference to the use of the word(s) "comprise" or "comprises" or "comprising" in this entire specification (including the claims below), it is noted that unless the context requires otherwise, those words are used on the basis and clear understanding that they are to be interpreted inclusively, rather than exclusively, and that it is intended each of those words to be so interpreted in construing this entire specification.

What is claimed is:

1. A process for reforming an alcohol, the process comprising:
contacting a feed gas mixture comprising an alcohol with a reforming catalyst to produce a reforming product mixture comprising hydrogen, the reforming catalyst comprising a metal sponge supporting structure and a copper coating at least partially covering the surface of the metal sponge supporting structure, wherein the metal sponge supporting structure is prepared by a process comprising leaching aluminum from an alloy comprising aluminum and a base metal.

2. A process as set forth in claim 1, wherein the feed gas mixture comprises a primary alcohol selected from the group consisting of methanol, ethanol and mixtures thereof.

3. A process as set forth in claim 2, wherein the process further comprises introducing hydrogen from the reforming product mixture and oxygen into a fuel cell to produce electric power.

4. A process as set forth in claim 1, wherein the reforming catalyst has a surface area of from about 10 $m^2$/g to about 100 $m^2$/g as measured by the Brunauer-Emmett-Teller method.

5. A process as set forth in claim 4, wherein the reforming catalyst has a surface area of from about 25 $m^2$/g to about 100 $m^2$/g as measured by the Brunauer-Emmett-Teller method.

6. A process as set forth in claim 5, wherein the reforming catalyst has a surface area of from about 30 $m^2$/g to about 80 $m^2$/g as measured by the Brunauer-Emmett-Teller method.

7. A process as set forth in claim 1, wherein the reforming catalyst comprises at least about 10% by weight copper.

8. A process as set forth in claim 1, wherein the reforming catalyst comprises from about 10% to about 90% by weight copper.

9. A process as set forth in claim 1, wherein the metal sponge supporting structure of the reforming catalyst has a surface area of at least about 10 $m^2$/g as measured by the Brunauer-Emmett-Teller method.

10. A process as set forth in claim 9, wherein the metal sponge supporting structure of the reforming catalyst has a surface area of at least about 50 m²/g as measured by the Brunauer-Emmett-Teller method.

11. A process as set forth in claim 10, wherein the metal sponge supporting structure of the reforming catalyst has a surface area of at least about 70 m²/g as measured by the Brunauer-Emmett-Teller method.

12. A process as set forth in claim 9, wherein the metal sponge supporting structure comprises nickel.

13. A process as set forth in claim 12, wherein the metal sponge supporting structure comprises at least about 50% by weight nickel.

14. A process as set forth in claim 13, wherein the metal sponge supporting structure comprises at least about 85% by weight nickel.

15. A process as set forth in claim 12, wherein the reforming catalyst comprises from about 10% to about 80% by weight copper.

16. A process as set forth in claim 15, wherein the reforming catalyst comprises from about 20% to about 45% by weight copper.

17. A process as set forth in claim 12, wherein the reforming catalyst comprises from about 5 to about 100 μmol/g of nickel at the surface of said catalyst.

18. A process as set forth in claim 17, wherein the reforming catalyst comprises from about 10 to about 80 μmol/g of nickel at the surface of said catalyst.

19. A process as set forth in claim 18, wherein the reforming catalyst comprises from about 15 to about 75 μmol/g of nickel at the surface of said catalyst.

20. A process as set forth in claim 12, wherein the feed gas mixture comprises a primary alcohol selected from the group consisting of methanol, ethanol and mixtures thereof.

21. A process as set forth in claim 20, wherein the feed gas mixture comprises ethanol.

22. A process as set forth in claim 21 wherein the reforming product mixture comprises methane.

23. A process as set forth in claim 22 comprising feeding methane obtained in the reforming product mixture to an internal combustion engine.

24. A process as set forth in claim 22 comprising feeding hydrogen obtained in the reforming product mixture to an internal combustion engine.

25. A process as set forth in claim 12, wherein the process further comprises introducing hydrogen from the reforming product mixture and oxygen into a fuel cell to produce electric power.

26. A process as set forth in claim 1, wherein said feed gas mixture is contacted with said reforming catalyst at a temperature below about 400° C.

27. A process as set forth in claim 1, wherein said feed gas mixture is contacted with said reforming catalyst at a temperature of from about 200° C. to about 375° C.

28. A process as set forth in claim 27, wherein said feed gas mixture is contacted with said reforming catalyst at a temperature of from about 250° C. to about 325° C.

29. A process as set forth in claim 1, wherein the reforming catalyst is incorporated onto the surface of a pellet or a monolith substrate.

30. A process as set forth in claim 29, wherein the reforming catalyst comprises a nickel sponge supporting structure.

31. A process as set forth in claim 1 wherein preparation of the reforming catalyst comprises depositing copper onto the metal sponge supporting structure.

32. A process as set forth in claim 31 wherein copper is deposited by a method comprising electrochemical displacement reaction between a metal of the metal sponge supporting structure and copper ions.

33. A process as set forth in claim 31 wherein copper is deposited by a method comprising electroless plating of copper metal on the metal sponge supporting structure.

34. A process as set forth in claim 1 wherein the base metal comprises copper and/or a non-copper metal selected from the group consisting of nickel, cobalt, zinc, silver, palladium, gold, tin, iron and mixtures thereof.

35. A process as set forth in claim 34 wherein the base metal comprises copper and/or a non-copper metal selected from the group consisting of nickel, cobalt and mixtures thereof.

36. A process as set forth in claim 35, wherein the base metal comprises nickel.

37. A process for reforming ethanol, the process comprising contacting a feed gas mixture comprising ethanol with a reforming catalyst at a temperature below about 400° C. to produce a reforming product mixture comprising hydrogen, said reforming catalyst comprising copper on the surface of a metal supporting structure.

38. A process as set forth in claim 37, wherein said feed gas mixture is contacted with said reforming catalyst at a temperature of from about 250° C. to about 300° C.

39. A process as set forth in claim 37, wherein the reforming catalyst has a thermal conductivity at 300K of at least about 50 W/m·K.

40. A process as set forth in claim 39, wherein the reforming catalyst has a thermal conductivity at 300K of at least about 70 W/m·K.

41. A process as set forth in claim 40, wherein the reforming catalyst has a thermal conductivity at 300K of at least about 90 W/m·K.

42. A process as set forth in claim 37, wherein the process further comprises introducing hydrogen from the reforming product mixture and oxygen into a fuel cell to produce electric power.

43. A process as set forth in claim 37, wherein the reforming catalyst has a surface area of from about 10 m²/g to about 100 m²/g as measured by the Brunauer-Emmett-Teller method.

44. A process as set forth in claim 43, wherein the reforming catalyst has a surface area of from about 25 m²/g to about 100 m²/g as measured by the Brunauer-Emmett-Teller method.

45. A process as set forth in claim 44, wherein the reforming catalyst has a surface area of from about 30 m²/g to about 80 m²/g as measured by the Brunauer-Emmett-Teller method.

46. A process as set forth in claim 37, wherein the reforming catalyst comprises at least about 10% by weight copper.

47. A process as set forth in claim 46, wherein the reforming catalyst comprises from about 10% to about 90% by weight copper.

48. A process as set forth in claim 37, wherein the metal supporting structure comprises a metal sponge.

49. A process as set forth in claim 48 wherein the metal sponge supporting structure is prepared by a process comprising leaching aluminum from an alloy comprising aluminum and a base metal.

50. A process as set forth in claim 49 wherein the base metal comprises copper and/or a non-copper metal selected from the group consisting of nickel, cobalt, zinc, silver, palladium, gold, tin, iron and mixtures thereof.

51. A process as set forth in claim 50 wherein the base metal comprises copper and/or a non-copper metal selected from the group consisting of nickel, cobalt and mixtures thereof.

52. A process as set forth in claim 51 wherein the base metal comprises nickel.

53. A process as set forth in claim 48 wherein the reforming catalyst comprises a copper coating at least partially covering the surface of the metal sponge supporting structure.

54. A process as set forth in claim 53 wherein preparation of the reforming catalyst comprises depositing copper onto the metal sponge supporting structure.

55. A process as set forth in claim 54 wherein copper is deposited by a method comprising electrochemical displacement reaction between a metal of the metal sponge supporting structure and copper ions.

56. A process as set forth in claim 54 wherein copper is deposited by a method comprising electroless plating of copper metal on the metal sponge supporting structure.

57. A process as set forth in claim 48, wherein the metal sponge supporting structure of the reforming catalyst has a surface area of at least about 10 m$^2$/g as measured by the Brunauer-Emmett-Teller method.

58. A process as set forth in claim 57, wherein the metal sponge supporting structure of the reforming catalyst has a surface area of at least about 50 m$^2$/g as measured by the Brunauer-Emmett-Teller method.

59. A process as set forth in claim 58, wherein the metal sponge supporting structure of the reforming catalyst has a surface area of at least about 70 m$^2$/g as measured by the Brunauer-Emmett-Teller method.

60. A process as set forth in claim 48, wherein the metal sponge supporting structure comprises nickel.

61. A process as set forth in claim 60, wherein the metal sponge supporting structure comprises at least about 50% by weight nickel.

62. A process as set forth in claim 61, wherein the metal sponge supporting structure comprises at least about 85% by weight nickel.

63. A process as set forth in claim 60, wherein the reforming catalyst comprises from about 10% to about 80% by weight copper.

64. A process as set forth in claim 63, wherein the reforming catalyst comprises from about 20% to about 45% by weight copper.

65. A process as set forth in claim 60, wherein the reforming catalyst comprises from about 5 to about 100 μmol/g of nickel at the surface of said catalyst.

66. A process as set forth in claim 65, wherein the reforming catalyst comprises from about 10 to about 80 μmol/g of nickel at the surface of said catalyst.

67. A process as set forth in claim 66, wherein the reforming catalyst comprises from about 15 to about 75 μmol/g of nickel at the surface of said catalyst.

68. A process as set forth in claim 60, wherein the process further comprises introducing hydrogen from the reforming product mixture and oxygen into a fuel cell to produce electric power.

69. A process as set forth in claim 37, wherein the reforming catalyst is incorporated onto the surface of a pellet or a monolith substrate.

70. A process as set forth in claim 69, wherein the reforming catalyst comprises a nickel sponge supporting structure.

71. A process as set forth in claim 37 wherein the reforming product mixture comprises methane.

72. A process as set forth in claim 71 comprising feeding methane obtained in the reforming product mixture to an internal combustion engine.

73. A process as set forth in claim 71 comprising feeding hydrogen obtained in the reforming product mixture to an internal combustion engine.

* * * * *